(12) United States Patent
Yang et al.

(10) Patent No.: US 12,309,821 B2
(45) Date of Patent: May 20, 2025

(54) SYSTEMS AND METHODS FOR PROVIDING PHYSICAL DOWNLINK CONTROL CHANNEL (PDCCH) PERFORMANCE FEEDBACK

(71) Applicant: QUALCOMM Incorporated, San Diego, CA (US)

(72) Inventors: Wei Yang, San Diego, CA (US); Yi Huang, San Diego, CA (US); Wanshi Chen, San Diego, CA (US); Peter Gaal, San Diego, CA (US); Hwan Joon Kwon, San Diego, CA (US); Krishna Kiran Mukkavilli, San Diego, CA (US); Tingfang Ji, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 885 days.

(21) Appl. No.: 17/444,533

(22) Filed: Aug. 5, 2021

(65) Prior Publication Data

US 2022/0046651 A1 Feb. 10, 2022

Related U.S. Application Data

(60) Provisional application No. 62/706,307, filed on Aug. 7, 2020.

(51) Int. Cl.
*H04W 72/542* (2023.01)
*H04L 1/1607* (2023.01)
*H04L 1/20* (2006.01)
*H04W 72/21* (2023.01)
*H04W 72/23* (2023.01)

(52) U.S. Cl.
CPC ......... *H04W 72/542* (2023.01); *H04L 1/1664* (2013.01); *H04L 1/203* (2013.01); *H04W 72/21* (2023.01); *H04W 72/23* (2023.01)

(58) Field of Classification Search
CPC ... H04W 72/542; H04W 72/21; H04W 72/23; H04L 1/1664; H04L 1/203
USPC ....................................................... 370/329
See application file for complete search history.

(56) References Cited

U.S. PATENT DOCUMENTS

| | | | | |
|---|---|---|---|---|
| 2015/0327229 A1* | 11/2015 | Zhang | ....................... | H04L 5/14 370/280 |
| 2018/0279327 A1* | 9/2018 | Ying | ................. | H04W 72/0446 |
| 2021/0152318 A1* | 5/2021 | Park | ....................... | H04L 5/0057 |
| 2023/0126574 A1* | 4/2023 | Ji | .............................. | H04L 5/00 370/329 |

* cited by examiner

*Primary Examiner* — Chi Tang P Cheng
(74) *Attorney, Agent, or Firm* — Haynes and Boone, LLP

(57) ABSTRACT

Some aspects of the present disclosure disclose methods and systems related to providing feedback to a base station about the performance of a physical downlink control channel (PDCCH). In some aspects, a user equipment (UE) may determine a number of missing physical downlink control channel (PDCCH) transmissions and/or a number of successful PDCCH transmissions transmitted to the UE via a PDCCH by a base station (BS) of a wireless communication network to which the UE is connected and communicate, to the BS, an indicator of PDCCH decoding performance based on the number of missing PDCCH transmissions and/or the number of successful PDCCH transmissions. Additional features are claimed and described.

30 Claims, 11 Drawing Sheets

SYSTEMS AND METHODS FOR PROVIDING PHYSICAL DOWNLINK CONTROL CHANNEL (PDCCH) PERFORMANCE FEEDBACK

CROSS-REFERENCE TO RELATED APPLICATIONS

The present application claims priority to and the benefit of the U.S. Provisional Patent Application No. 62/706,307, filed Aug. 7, 2020, titled "Physical Downlink Control Channel (PDCCH) Performance Feedback," which is hereby incorporated by reference in its entirety as if fully set forth below and for all applicable purposes.

FIELD OF TECHNOLOGY

The following relates generally to wireless communications and more specifically to providing feedback to a base station about the performance of a physical downlink control channel (PDCCH).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In LTE as well as in NR systems, a UE provides feedback to a base station (BS) to inform the base station about the performance of a physical downlink shared channel (PDSCH) that was used to transmit data from the BS to the UE. An example of such a feedback is the well known technique hybrid automatic repeat request (HARD) where the integrity of data packet PDSCH transmissions may be checked at the receiving side for accuracy and an acknowledgement (ACK) or negative acknowledgement (NACK) is transmitted back to the BS if the integrity of the transmission is confirmed or not. Another example is channel state information (CSI)/channel quality information (CQI) feedback mechanism that is based on measurements of channel state information-reference signal (CSI-RS).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure disclose a method of wireless communication performed by a user equipment (UE). Some aspects disclose a UE comprising a memory; a processor coupled to the memory; and a transceiver coupled to the processor, the UE configured to perform the method. Further, some aspects disclose a UE comprising means for performing the method. In addition, some aspects disclose a non-transitory computer-readable medium having program code recorded thereon for wireless communication by a UE, the program code comprising code for causing the UE to perform the method.

In some aspects, the method comprises detecting that (i) one or more first physical downlink control channel (PDCCH) transmissions are missing at the UE, and/or (ii) one or more second PDCCH transmissions are successfully decoded at the UE, the one or more first and/or second PDCCH transmissions transmitted to the UE by a base station (BS) of a wireless communications network to which the UE is connected; and communicating, to the BS, an indicator of PDCCH decoding performance based on a number of the first one or more PDCCH transmissions and/or a number of the second one or more PDCCH transmissions.

In some aspects, the method comprises receiving, from a base station (BS) of a wireless communication network to which the UE is connected, a reference signal; measuring a channel quality indicator of a physical downlink control channel (PDCCH) transmission from the BS to the UE based on the received reference signal; and communicating, to the BS, the channel quality indicator.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
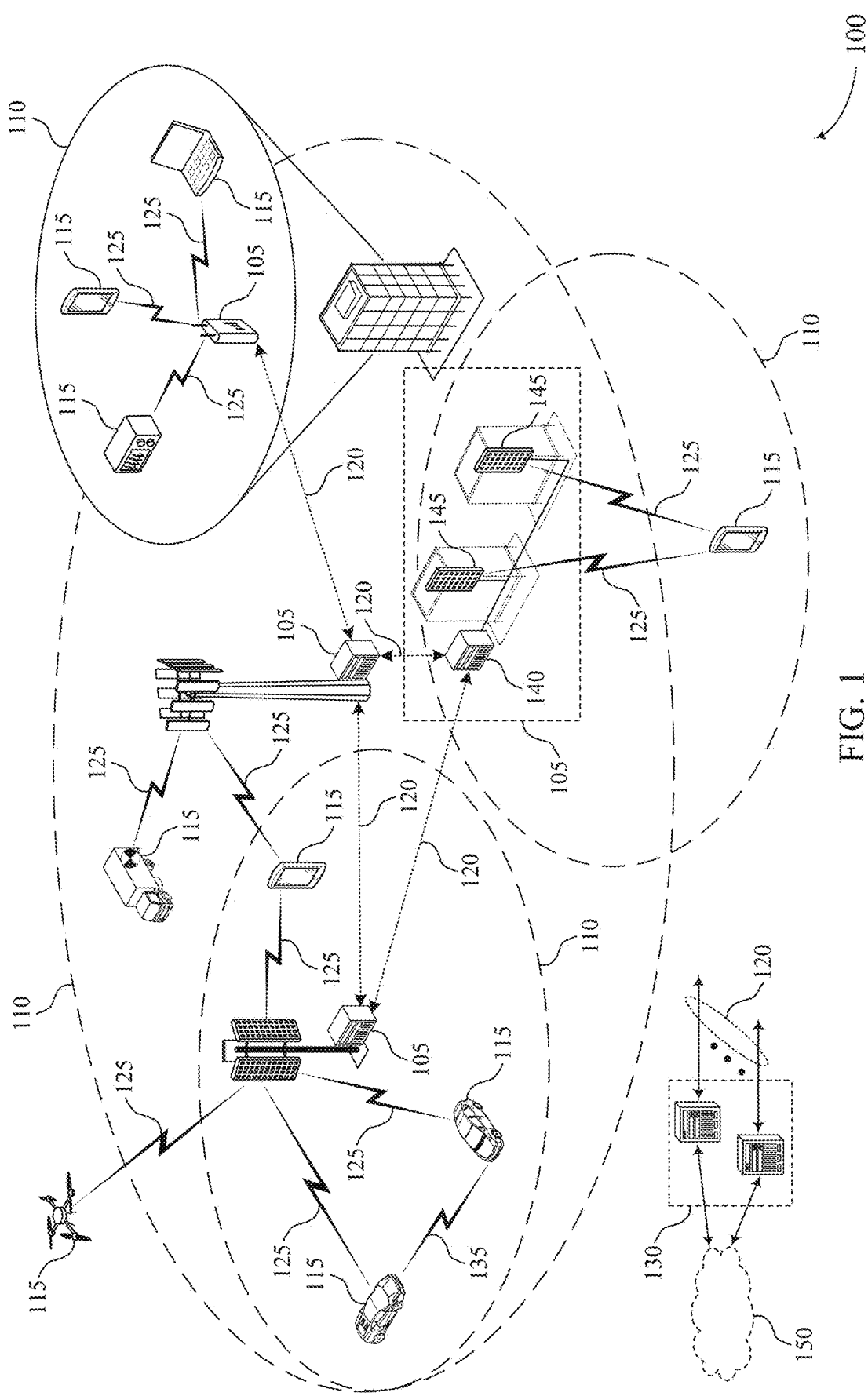
FIG. 1 illustrates a wireless communication network, according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR is expected to support a variety of use cases, such as enhanced mobile broadband (eMBB), ultra-reliable low-latency (uRLLC), massive machine type communications (mMTC), etc. Because PDCCH plays central role in tasks such as downlink (DL) scheduling assignments, uplink (UL) scheduling assignments, special purposes such as slot format indication, preemption indication, power control performance, etc., PDCCH performance can be critical for some of these use cases, in particular to uRLLC which can have stringent latency and reliability requirements As such, it is desirable for a base station (BS) to identify any performance issues related to a PDCCH. It is, however, a difficult task for the BS to diagnose or identify such performance issues by itself. Accordingly, aspects of the present disclosure provide solutions where a UE provides PDCCH performance feedback to a BS.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates an example wireless communication network 100 according to some aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Additionally, it is noted here that the subcarrier spacing (SCS) has an effect on the number of symbols, such as OFDM symbols, within a subframe. In particular, as SCS spacing gets wider or greater, the slot length will become shorter. For example, a scheduling cell (e.g., base station or gNB) can have an SCS of 15 kHz (i.e., spacing parameter µ=0 in known spacing numerology where the SCS or frequency spacing Δf is determined by the equation $\Delta f=2^\mu \times 15$ kHz), which is typically the shortest used SCS spacing, and the scheduled cells (e.g., UEs) can utilize an SCS of 120 kHz (i.e., spacing parameter µ=3 in known spacing numerology) for purposes of this example, but those skilled in the art will appreciate the present disclosure is applicable to any of a number of SCS spacings. In known systems, the 15 kHz SCS would result in a one (1) millisecond (ms) slot, which could also constitute an entire 1 ms subframe. The 120 kHz SCS would result in 8 slots having a duration of ⅛ or 0.125 ms in the 1 ms subframe. These slots can represent eight PDSCH transmissions in a scheduled cell that are scheduled by the PDCCH in the scheduling cell. Of further note, in this example the single slot of the scheduling cell overlaps in time with the eight slots of the scheduled cell when 15 kHz SCS and 120 kHz SCSs are respectively used for the two cells, but other SCS values will result in other numerologies and overlaps, such as one scheduling cell slot overlapping four slots of a scheduled cell in an example of 15 kHz SCS in the scheduling cell and 60 kHz SCS (i.e., µ=2) in the scheduled cell.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully, i.e., the data is decoded successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may select values for scheduling or slot offset parameters in a radio frame structure representing resources (e.g., time-frequency resources) for signal communications between the UE 115 and the base stations 105, the requested values for the set of parameters based at least in part on system state information of the UE 115 and attributes related to an operational or activity mode of an application executing or operating on the UE 115. The UE 115 may transmit, to a base station 105, the selected values for the set of parameters. The UE 115 may receive, at least in part as response to the selected values for the set of parameters transmitted to the base station 105, the configured values for the set of slot offset parameters for the UE 115. The UE 115 may then communicate with the base station 105 according to the configured parameters.

Figure 2:
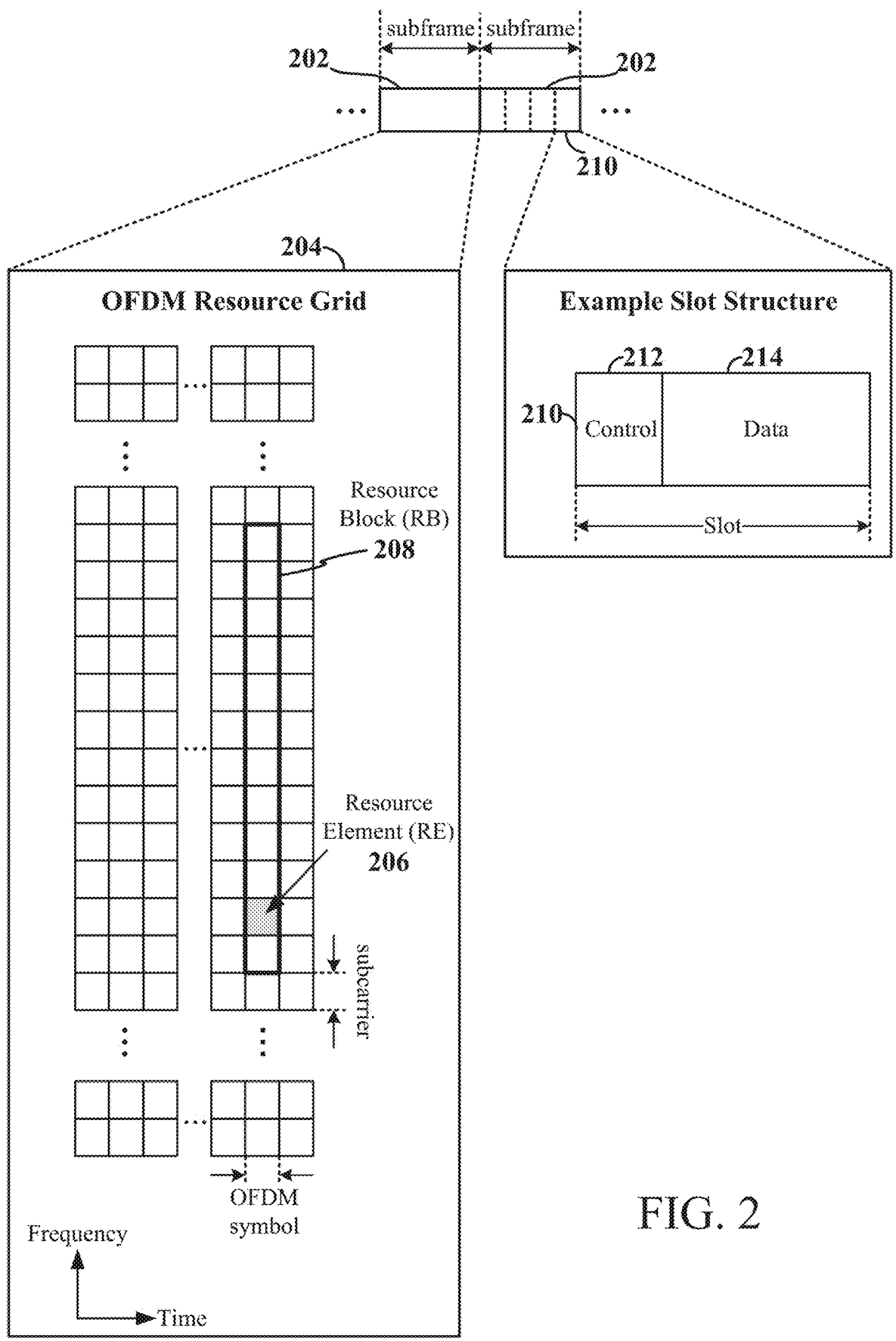
FIG. 2 illustrates an example schematic of an organization of wireless resources in an air interface utilizing orthogonal frequency divisional multiplexing (OFDM), according to some aspects of the present disclosure.

FIG. 2 illustrates an example schematic of an organization of wireless resources in an air interface utilizing orthogonal frequency divisional multiplexing (OFDM), according to some aspects of the present disclosure. It should be understood by those of ordinary skill in the art that the various aspects of the present disclosure may be applied, for example, to a DFT-s-OFDMA or an SC-FDMA waveform in substantially the same way as described herein below. That is, while some examples of the present disclosure may focus on an OFDM link for clarity, it should be understood that the same principles may be applied as well to DFT-s-OFDMA or SC-FDMA waveforms. In FIG. 2, an expanded view of an exemplary subframe 202 is illustrated, showing an OFDM resource grid. However, as those skilled in the art can readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The radio frame structure or resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. A RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, in some aspects, it can be assumed that a single RB such as the RB 208 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 206 within one or more sub-bands. Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

According to some examples, a frame may refer to a duration of 10 ms, with each frame sub-divided into 10 subframes 202 of 1 ms each. Each 1 ms subframe may consist of one or multiple adjacent slots. In the example shown in FIG. 2, subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., 1, 2, or 3 OFDM symbols). These mini-slots, or shortened TTIs, may in some cases be transmitted occupying resources scheduled for ongoing slot transmissions for the same or for different UEs. Any number of resource blocks may be utilized within a subframe or slot.

An expanded view of one of the slots 210 illustrates the slot as including a control region 212 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 210 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a PBCH; a PSS; a SSS; a physical control format indicator channel (PCFICH); a physical hybrid automatic repeat request (HARD) indicator channel (PHICH); and/or a physical downlink control channel (PDCCH), etc., to one or more scheduled entities (e.g., UEs). The PCFICH provides information to assist a receiving device in receiving and decoding the PDCCH. The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the scheduled entity may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), or any other suitable UCI.

In addition to control information, one or more REs 206 (e.g., within the data region 214) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry system information blocks (SIBs), carrying information that may enable access to a given cell.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., V2X or other sidelink device) towards a set of one or more other receiving sidelink devices. The PSCCH may include HARQ feedback information (e.g., ACK/NACK) that may be used to indicate a need, or lack of need, for retransmissions on the sidelink. The data region 214 of the slot 210 may include a physical sidelink shared channel (PSSCH) including the data transmitted by the initiating (transmitting) sidelink device within resources reserved over the sidelink carrier by the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above are not necessarily all the channels or carriers that may be utilized between a scheduling entity 108 and scheduled entities (e.g., one of more UE 106), and those of ordinary skill in the art may recognize that other channels or carriers may be utilized in addition to those illustrated, such as other traffic, control, and feedback channels.

Figure 3:
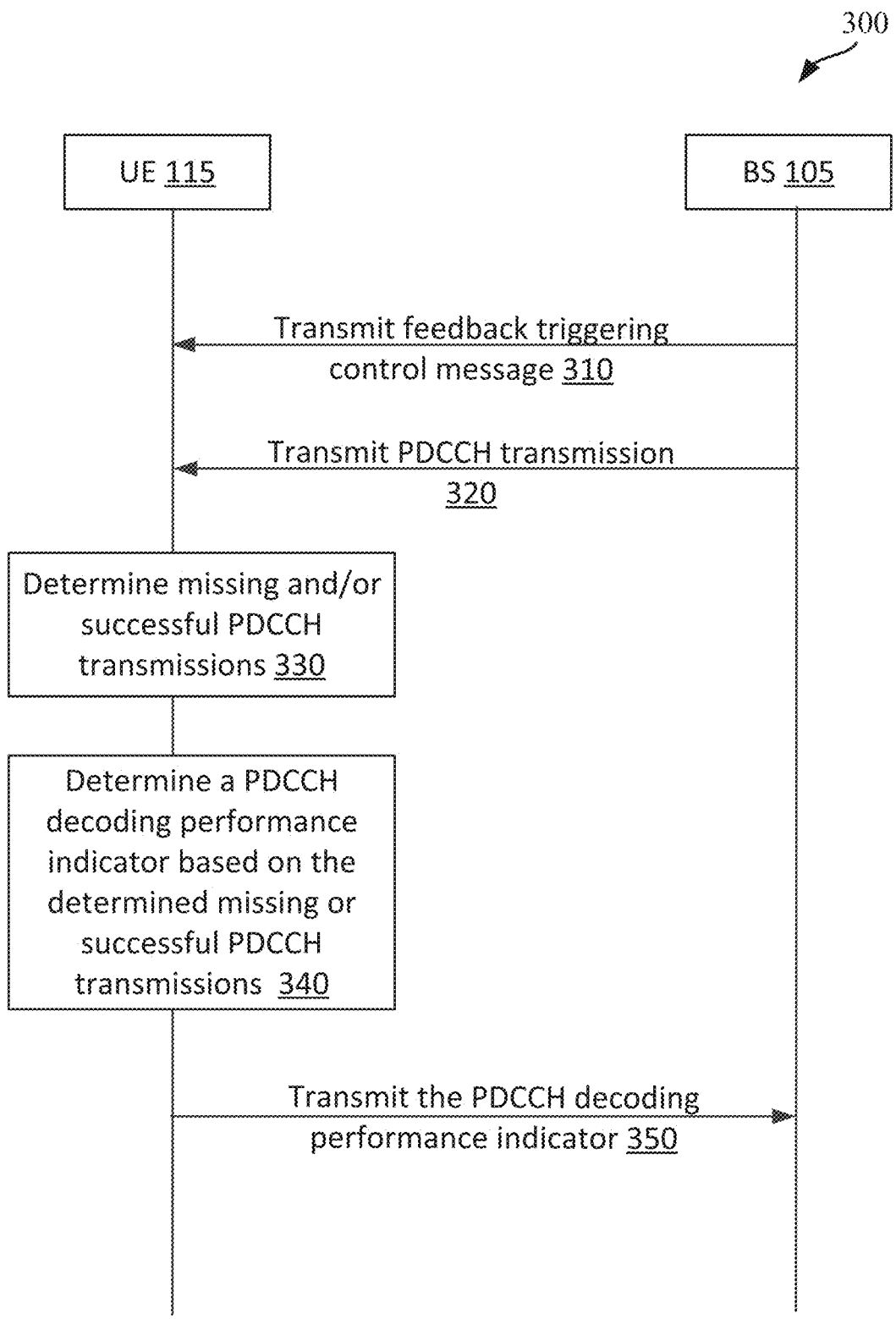
FIG. 3 shows an example signaling diagram illustrating a communication method with physical downlink control channel (PDCCH) feedback, according to some aspects of the present disclosure.

FIG. 3 shows an example signaling diagram illustrating a communication method with physical downlink control channel (PDCCH) feedback, according to some aspects of the present disclosure. Communication may be between a UE 115 and an BS 105. In some aspects, the order of the communications between the UE 115 and the BS 105 may be different than what is shown in the example diagram of FIG. 3. For example, although FIG. 3 shows action 310 coming before action 320, in some aspects, action 320 may occur prior to action 310.

At action 310, the BS 105 transmits to the UE 115 a control message to trigger the UE 115 to determine a performance indicator for the PDCCH and feed the performance indicator back to the BS 105. In some aspects, the control message can be a radio resource control (RRC) message, i.e., the feedback may be a semi-statically configured feedback. In some aspects, the RRC message may include the parameters for providing the feedback, such as the periodicity for the UE 115 to determine and provide the PDCCH performance feedback to the BS 105. In some aspects, the RRC message may also indicate the uplink resource to be used by the UE 115 for transmitting the PDCCH performance feedback to the BS 105. For example, the RRC message may indicate that the UE 115 can use a physical uplink control channel (PUCCH) resource or a physical uplink shared channel (PUSCH) to transmit the feedback to the BS 105. In the former case, for example, the UE 115 may use an uplink control information (UCI) to transmit the PDCCH performance feedback via the uplink resource PUCCH. In the latter case, in some aspects, the feedback may be piggybacked on the data that is being uplinked via the PUSCH or may be transmitted via a medium access control (MAC)-control element (CE) transmission.

In some aspects, the control message from the BS 105 that triggers the feedback from the UE 115 can be a dynamic downlink control information (DCI) sent to the UE 115 and carried in a PDCCH. For example, the DCI can be a downlink (DL) scheduling DCI, an uplink (UL) scheduling DCI or a group-common DCI. In some aspects, a DL scheduling DCI may indicate the uplink resource that the UE can use to provide the PDCCH performance feedback to the BS 105. For instance, the DL scheduling DCI may indicate that the UE 115 can use a PUCCH resource for the transmitting the PDCCH performance feedback to the BS 105. In the case of UL scheduling DCI, the PDCCH performance feedback transmitted to the BS 105 maybe included in the PUSCH.

In some aspects, a group common DCI can be advantageous from a network performance point of view, as it may reduce the overhead associated with the UE 115 providing PDCCH performance feedback to the BS 105. Further, the use of group common DCI would not interfere with the scheduling DCIs. In some aspects, the UE 115 may periodically monitor the PDCCH for the group-common DCI. In some cases, the periodicity of the monitoring can be the same as or different from the periodicity with which the UE 115 determines the PDCCH performance.

At action 320, the UE 115 may receive PDCCH transmissions from the BS 105. In some aspects, the PDCCH transmissions can be any transmission carried in the PDCCH, such as but not limited to a DL grant. In some aspects, the performance indicator for the PDCCH can be whether the PDCCH transmissions from the BS 105 are correctly decoded at the UE 115 or not. In other words, the performance indicator can be a PDCCH decoding performance indicator. As such, for example, the PDCCH performance indicator can be whether the DL grants from the BS 105 to the UE 115 are correctly decoded or not, and the number thereof.

In some aspects, a DL DCI grant or assignment may include a counter downlink assignment index or indicator (DAI) and a total DAI. DAI is a value transmitted to the UE 115 by the BS 105 that indicates the number of downlink subframes with PDCCH that are to be acknowledged by the UE 115. That is, it may represent the number of downlink acknowledgment reports to be transmitted by the UE 115 to the BS 105 via an uplink resource, which can be PUSCH or PUCCH. The counter DAI may indicate the cumulative number of resource scheduling until the moment the DL DCI is received, i.e., the number of scheduled downlink transmissions up to the point the DL DCI is received in a carrier or cell first, time second manner, while the total counter may indicate the total resource scheduling until that moment, i.e., the total number of downlink transmissions across all carriers or cells up to this point in time, that is, the highest counter DAI at the current point in time.

At action 330, the UE 115 may determine the number of missing PDCCH transmissions and/or the number of successful PDCCH transmissions to arrive at the UE 115 from the BS 105. In some aspects, the term "missing PDCCH transmissions" may refer to those PDCCH transmissions that are transmitted by the BS to the UE but either did not arrive at the UE or were not decoded accurately or successfully at the UE. Further, the term "successful PDCCH transmissions" may refer to those PDCCH transmissions from the BS to the UE that arrived, and were correctly or successfully decoded, at the UE.

Figure 11:
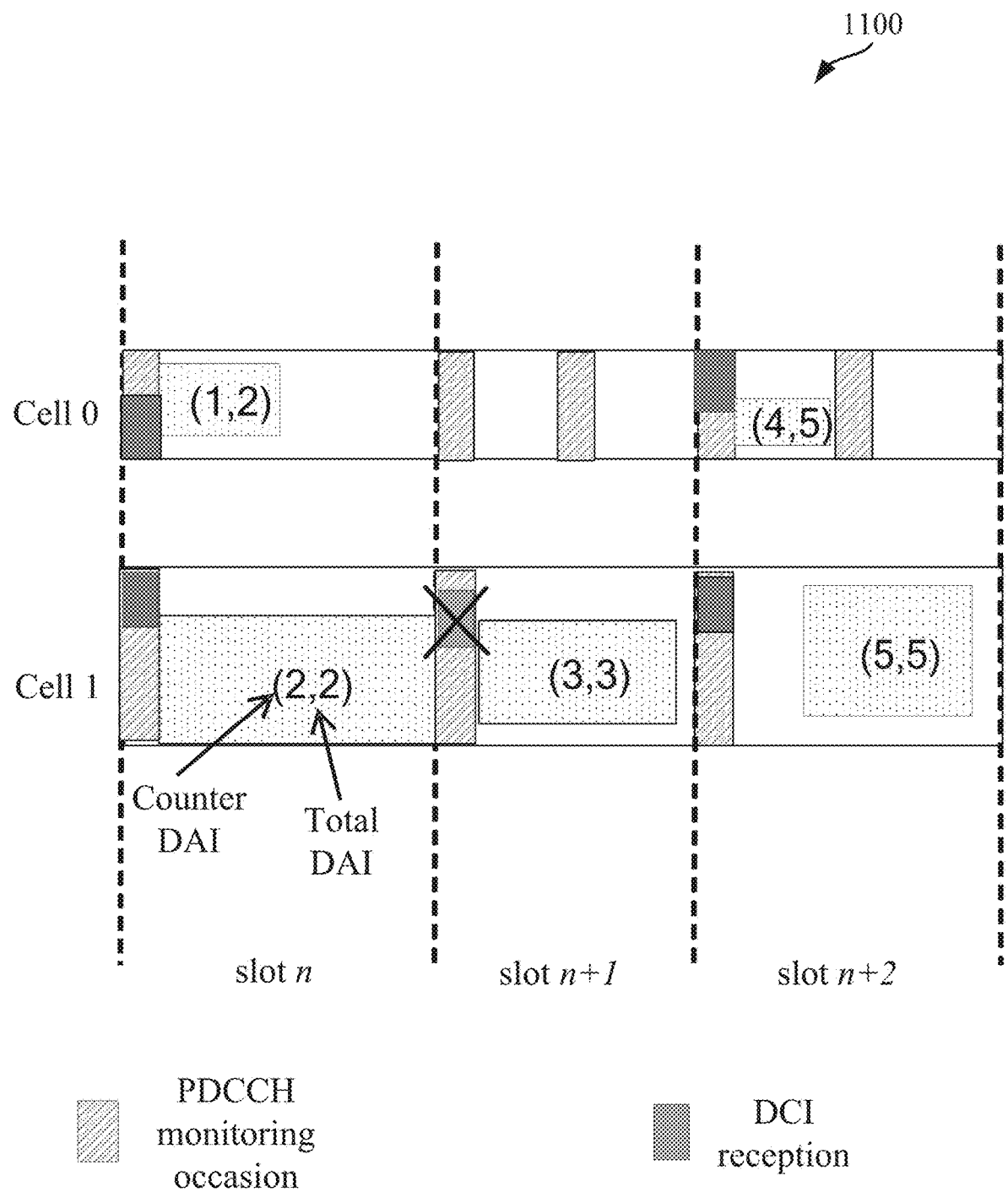
FIG. 11 shows example schematic of downlink assignment indicator (DAI) mechanism in new radio (NR) according to some aspects of the present disclosure.

In some aspects, the UE 115 may determine the number of PDCCH transmission that are correctly decoded (i.e., the number of successful PDCCH transmissions) and/or the number of PDCCH transmission that are not correctly decoded (i.e., the number of missing PDCCH transmissions) by referring to the DAI (e.g., counter DAI and total DAI) in the DL DCI. DAI mechanism in NR may be illustrated with reference to FIG. 11, which shows example schematic of three slots of two cells or carriers with multiple PDCCH monitoring occasions, where a PDCCH transmission scheduling the third physical downlink shared channel (PDSCH) at slot n+1 is missing. The UE 115 may be able to determine that this PDCCH transmission is missing because the counter DAI=3 is missing. In another example, if the missing PDCCH is the last one (i.e., the one scheduling the last PDSCH transmission), the UE may be able to determine that that PDCCH is missing by referring to the total DAI (e.g., the total DAI indicates five PDCCH transmission where only four are correctly decoded). DAI mechanism is further discussed in the 3GPP document TS 38.213, titled "Technical Specification 5G; NR; Physical layer procedures for control (3GPP TS 38.213 version 15.5.0 Release 15)", May 2019, which is incorporated herein by reference in its entirety.

At action 340, the UE 115 may determine a PDCCH decoding performance indicator based on the number of missing PDCCH transmissions and/or the number of successful PDCCH transmissions (e.g., as determined based on counter DAI and/or total DAI). That is, the PDCCH decoding performance indicator may be determined based on the number of PDCCH transmission that are correctly decoded and/or the number of PDCCH transmission that are not correctly decoded. For example, the PDCCH decoding performance indicator can be a PDCCH decoding error probability calculated as a ratio of the number of missing PDCCH transmissions and the sum of the number of the missing PDCCH transmissions and the number of successful PDCCH transmissions. As another example, the PDCCH decoding performance indicator can be a PDCCH decoding success probability calculated as a ratio of the number of successful PDCCH transmissions and the sum of the number of the missing PDCCH transmissions and the number of successful PDCCH transmissions. In some aspects, the PDCCH decoding performance indicator can be the number of missing PDCCH transmissions. In some aspects, the PDCCH decoding performance indicator can be the number of successful PDCCH transmissions. It is to be noted that, the number of successful PDCCH transmissions, the number of missing PDCCH transmissions, the PDCCH decoding error probability, the PDCCH decoding success probability mentioned above are non-limiting examples, and any other measured based on the number of missing PDCCH transmissions and/or the number of successful PDCCH transmissions can serve as a measure or indicator of PDCCH decoding performance.

In some aspects, the PDCCH decoding performance indicator may be based on PDCCH measurement over a period of time, instead of or in addition to being based on a particular PDCCH transmission. For example, a UE 115 may be configured to monitor over a period of time multiple control resource sets (CORESETs) of the resource grid, which are used in NR to carry PDCCH (DCI) transmissions. That is, PDCCH transmissions in NR are configured to be transmitted in specifically designed CORESET regions, and the UE 115 may monitor these regions for PDCCH transmissions. Each CORESET can be configured with multiple transmission configuration indication (TCI) state configurations, which represent multiple corresponding beams for PDCCH. MAC-CE can be used to down-select one particular beam from the multiple beams for each CORESET. However, because different CORESETs may have different beams, and as a result the PDCCH measured at different CORESETs may have different PDCCH decoding performance. In such cases, the UE 115 may determine CORESET-specific PDCCH decoding performance indicators. That is, the UE 115 may determine the above-discussed PDCCH decoding performance indicators (e.g., the number of successful PDCCH transmissions, the number of missing PDCCH transmissions, the PDCCH decoding error probability, the PDCCH decoding success probability) for each CORESET.

In some aspects, the above-noted measures or indicators of PDCCH decoding performance can be computed for a certain amount of time, which can be a fixed duration or configured by the BS 105. For example, the duration can be the same as the period with which the UE 115 is configured, semi-statically or dynamically, to make PDCCH performance determinations and provide feedback to the BS 105.

In some aspects, the feedback from the UE 115 to the BS 105 about the PDCCH decoding performance can be per CORESET when the PDCCH measurements are performed over a period of time (e.g., in contrast to when the feedback is based on particular PDCCH measurements). For example, the decoding statistics or DMRS-based channel quality information (CQI)/channel state information (CSI) reports including the above-discussed PDCCH decoding performance indicators may be separate for each CORESET.

In some aspects, as discussed above, PDCCH transmissions in NR may be configured to be transmitted in specifically designed CORESET regions, and the UE 115 may monitor these regions for PDCCH transmissions. Each CORESET may be configured with multiple transmission configuration indication (TCI) state configurations, which represent multiple corresponding beams for PDCCH transmissions. In some instances, the UE 115 may provide feedback to the BS 105 about a preferred TCI state for PDCCH to use within the configured multiple TCI-states. In some cases, the feedback provided by the UE 115 to the BS 105 can be a per-CORESET feedback, or the feedback can be per-serving cell feedback. That is, in some cases, the UE 115 may communicate with the BS 105 with an indication of a preferred TCI state, of the multiple TCI states (e.g., of each CORESET) to use for the PDCCH transmissions.

At action 350, in some aspects, the UE 115 may provide the PDCCH decoding performance indicator to the BS 105. For example, the UE 115 may transmit to BS 105 the number of successful PDCCH transmissions, the number of missing PDCCH transmissions, the PDCCH decoding error probability and/or the PDCCH decoding success probability. As another example, the UE 115 may feedback the CORESET-specific PDCCH decoding performance indicators to the BS 105. In some cases, the UE 115 may first aggregate the CORESET-specific PDCCH decoding performance indicators and feedback the CORESET-aggregate PDCCH decoding performance indicator to the BS 105. In providing the afore-mentioned feedback to the BS 105, the UE 115 may utilize the uplink resources indicated by the control message that triggered the PDCCH decoding performance feedback. For example, the feedback may be in the form of a UCI via a PUCCH, piggybacked on uplink data via a PUSCH or via a MAC-CE, if feedback is triggered semi-statically by RRC messages. As another example, the feedback may be via a PUCCH resource or a PUSCH resource if feedback is triggered dynamically by a DCI.

In some aspects, instead of or in addition to the values of the PDCCH decoding performance indicators, the UE 115 may provide to the BS 105 ranges that include the values thereof. For example, if the UE 115 determines that the decoding error probability in percentages is 3%, instead of or in addition to providing the 3% value to the BS 105, the UE may report a range, e.g., between 1% and 5%. Similarly, instead of reporting exact numbers of missing or successful PDSCH transmissions, the UE 115 may report to the BS 105 ranges including the respective values. Such reporting of quantized values, as opposed to exact or nearly exact values, may aid with saving overhead associated with the reporting of PDCCH decoding performance statistics.

Figure 4:
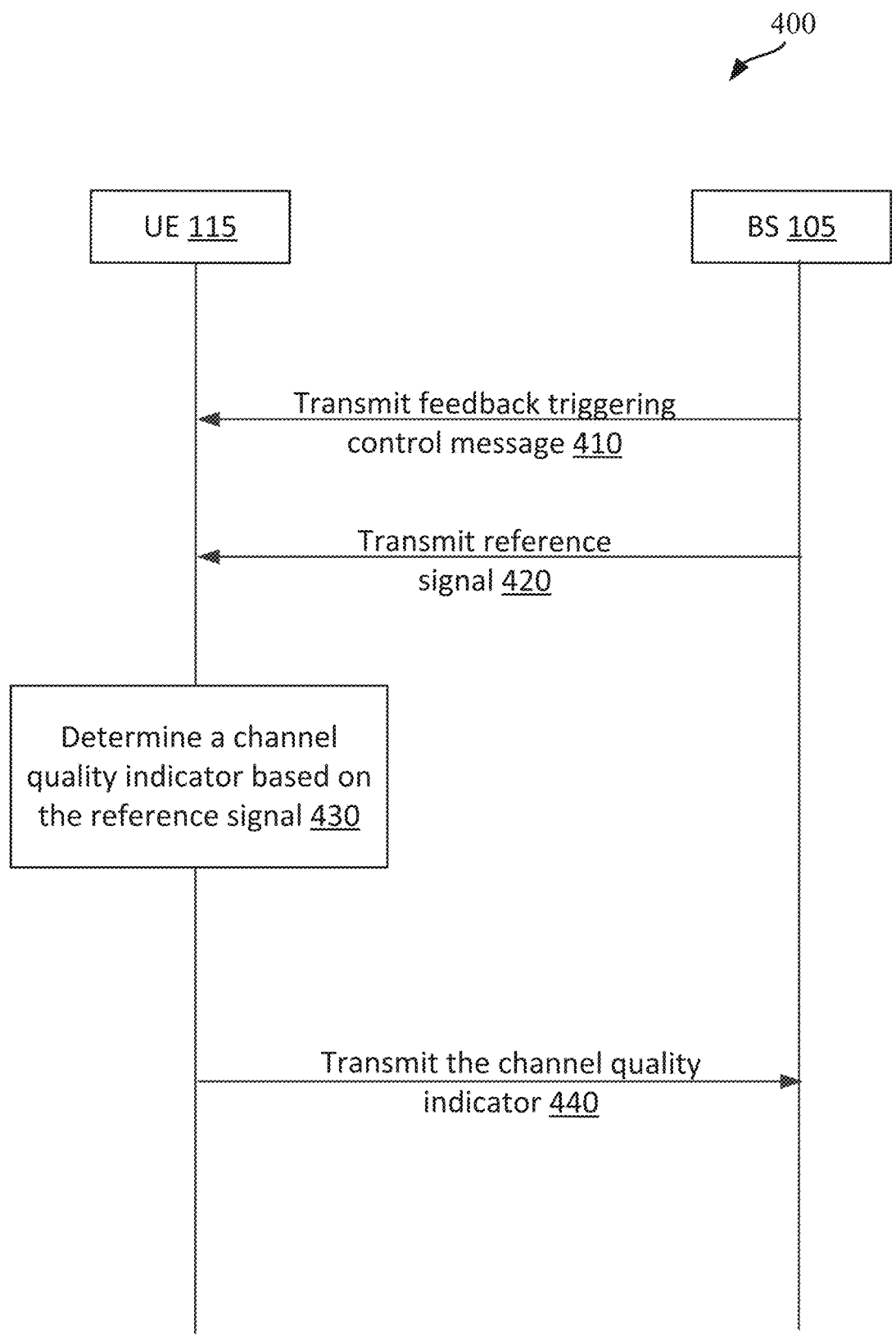
FIG. 4 an example signaling diagram illustrating a communication method with PDCCH feedback, according to some aspects of the present disclosure.

FIG. 4 shows an example signaling diagram illustrating a communication method with physical downlink control channel (PDCCH) feedback, according to some aspects of the present disclosure. Communication may be between a UE 115 and an BS 105. In some aspects, the order of the communications between the UE 115 and the BS 105 may be different than what is shown in the example diagram of FIG. 4. For example, although FIG. 3 shows action 410 coming before action 420, in some aspects, action 420 may occur prior to action 410.

At action 410, the BS 105 transmits to the UE 115 a control message to trigger the UE 115 to determine a performance indicator for the PDCCH and feed the performance indicator back to the BS 105, in a manner similar to action 310. For example, the control message can be a radio resource control (RRC) message, i.e., the feedback may be a semi-statically configured feedback. In some aspects, the RRC message may include the parameters for providing the feedback, such as but not limited to the periodicity for the UE 115 to determine and provide the PDCCH performance feedback to the BS 105. In some aspects, the RRC message may also indicate the uplink resource to be used by the UE 115 for transmitting the PDCCH performance feedback to the BS 105. For example, the RRC message may indicate that the UE 115 can use a physical uplink control channel (PUCCH) resource or a physical uplink shared channel (PUSCH) to transmit the feedback to the BS 105. In the former case, for example, the RRC message may indicate that UE 115 may use an uplink control information (UCI) to transmit the PDCCH performance feedback via the uplink resource PUCCH. In the latter case, in some aspects, the RRC message may indicate that the UE 115 may piggyback the feedback on the data that is being transmitted via the PUSCH or may transmit the feedback via a medium access control (MAC)-control element (CE).

In some aspects, the control message from the BS 105 that triggers the feedback from the UE 115 can be a dynamic downlink control information (DCI) transmitted to the UE 115 via a PDCCH. For example, the DCI can be a downlink (DL) scheduling DCI, an uplink (UL) scheduling DCI or a group-common DCI. In some aspects, the dynamic DCI may also indicate the resources that the UE 115 can use to transmit the PDCCH performance feedback to the BS 105. For example, in some aspects, a DL scheduling DCI may indicate that the UE 115 can use a PUCCH resource for the transmitting the PDCCH performance feedback to the BS 105. As another example, an UL scheduling DCI may indicate that the PDCCH performance feedback may be transmitted to the BS 105 included in the PUSCH scheduled by the UL scheduling DCI.

At 420, the UE 115 receives a reference signal from the BS 105. In some aspects, the reference signal can be a demodulation reference signal (DMRS). For example, the BS 105 may transmit to the UE 115 a PDCCH transmission including its own DMRS that is UE specific. In some aspects, the reference signal can be a channel state information-reference signal (CSI-RS) that may be used by the UE 115 for channel state estimation. In some aspects, the reference signal can be a synchronization signal block (SSB) signal. For example, the reference can be a primary synchronization signal and/or a secondary synchronization signal of the SSB.

At 430, the UE 115 determines a channel quality information (CQI) based on the received reference signal. For example, when the reference signal is a DMRS, the UE 115 can determine the reference signal received power (RSRP) of the control channel elements (CCEs) carrying the DMRS of the PDCCH, and the RSRP may be considered as a CQI of the PDCCH. Similarly, when the reference signal is a SSB signal, the UE 115 may determine the RSRP, for example, by computing the linear average of the received power on different resources of the PDCCH with the synchronization signals, and the RSRP may be considered as a CQI of the PDCCH. In some aspects, the UE 115 may also determine or estimate the CQI based on the CSI-RS.

In some aspects, the UE 115 may determine a hypothetical block error rate (BLER) based on the received reference signal, i.e., a hypothetical ratio, for the received reference signal, of erroneous blocks received at the UE 115 to total blocks sent by the BS 105, where an erroneous block is defined as a transport block of the received reference signal with a wrong cyclic redundancy check (CRC). That is, the UE 115 may determine a hypothetical BLER based on the received reference signal, i.e., DMRS, CSI-RS or SSB signals received from the BS 105, and the hypothetical BLER may be considered as a CQI of the PDCCH.

In some aspects, the UE 115 may determine an aggregation level (AL) that can be used by the PDCCH to meet a certain BLER target, and the AL can be considered as a CQI of the PDCCH. An AL indicates the number of CCEs, i.e., combinations of multiple resource element groups (REGs), that are allocated for a PDCCH. A PDCCH is confined to one CORESET and is carried by one, two, four, eight or sixteen CCEs, where a CCE contains 6 REGs. An REG is one resource block, i.e., 12 resource elements (REs) in a frequency domain and one OFDM symbol in the time domain of a NR resource grid, where an RE is the smallest unit within the NR resource grid comprising one subcarrier frequency in the frequency domain and one OFDM symbol in the time domain. In some aspects, the AL determined by the UE 115 may indicate the number of successive CCEs carrying the PDCCH transmission so that the BLER of the PDCCH transmission is no greater than a threshold BLER (e.g., between about 0.5% and 5%, such as 1%, etc., including values and subranges therebetween), and such AL may be considered as a CQI.

In some aspects, the UE 115 may determine the hypothetical BLER and/or the AL based on the same physical layer parameters of the PDCCH (e.g., DCI) used by the BS 105 to dynamically trigger the UE 115 to provide feedback to the BS 105. In some aspects, the UE 115 may determine the hypothetical BLER and/or the AL based on a set of reference physical layer parameters for PDCCH. Examples of such physical layer parameters (e.g., the reference set and/or the parameters of the DCI) include a precoder granularity of the CORESET of the PDCCH, the control channel element (CCE)-to-resource element group (REG) mapping type of the CORESET, the REG bundle size of the REG bundle of the CORESET indicating the number of REGs in the REG bundle, and/or the size of the DCI configured to trigger the communicating the CQI.

In some aspects, the UE 115 may determine the PDCCH performance based on the reference signal that is quasi-colocated with the corresponding CORESET. For example, the UE 115 may determine the PDCCH performance based on the PDCCH DMRS, CSI-RS or SSB signal that may be quasi-colocated with the CORESET, and the PDCCH performance, i.e., the channel quality indicator can be determined based on a measurement performed on the PDCCH DMRS, CSI-RS or the SSB signal, respectively. In some aspects, the UE 115 may perform this procedure for all configured CORESET, and provide the feedback to the BS 105 per CORESET, or feedback the aggregated reports for all CORESETs.

At action 440, in some aspects, the UE 115 may provide the CQI to the BS 105 as feedback on PDCCH performance. For example, the UE 115 may transmit to BS 105 RSRP, the hypothetical BLER and/or the AL. In providing the aforementioned feedback to the BS 105, the UE 115 may utilize the uplink resources indicated by the control message that triggered the PDCCH decoding performance feedback. For example, the feedback may be in the form of a UCI via a PUCCH, piggybacked on uplink data via a PUSCH or via a MAC-CE, if feedback is triggered semi-statically by RRC messages. As another example, the feedback may be via a PUCCH resource or a PUSCH resource if feedback is triggered dynamically by a PDCCH (DCI).

Figure 5:
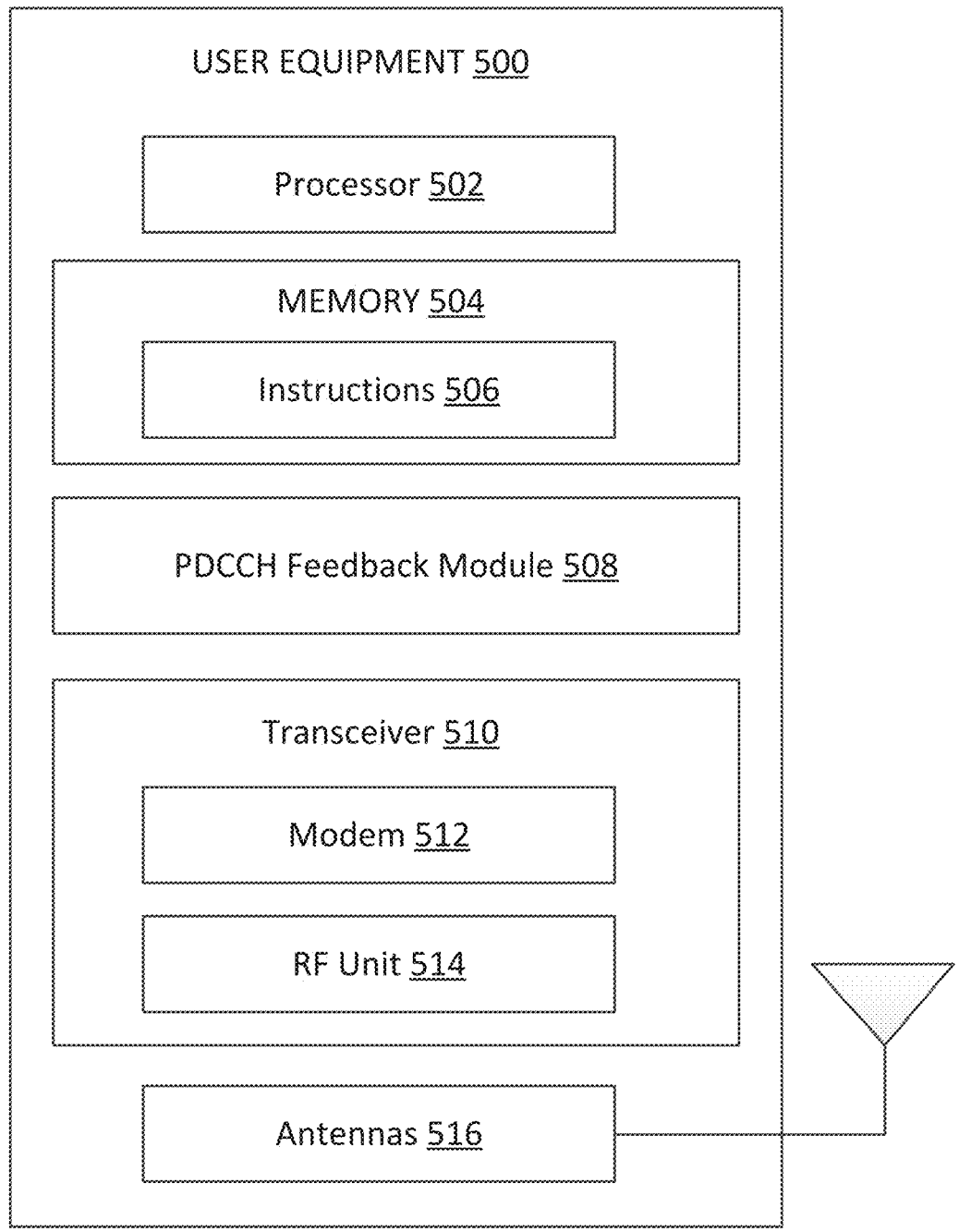
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 in the network 100 as discussed above in FIG. 1. As shown, the UE 500 may include a processor 502, a memory 504, a PDCCH feedback module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-4, 7, 8 and 11. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The PDCCH feedback module 508 may be implemented via hardware, software, or combinations thereof. For example, the PDCCH feedback module 508 may be implemented as a processor, circuit, and/or instructions 506 stored in the memory 504 and executed by the processor 502. In some examples, the PDCCH feedback module 508 can be integrated within the modem subsystem 512. For example, the PDCCH feedback module 508 can be implemented by a combination of software components (e.g., executed by a DSP or a general processor) and hardware components (e.g., logic gates and circuitry) within the modem subsystem 512. The PDCCH feedback module 508 may be used for various aspects of the present disclosure, for example, aspects of FIGS. 1-4, 7, 8 and 11. The PDCCH feedback module 508 can be configured to determine a number of missing physical downlink control channel (PDCCH) transmissions and/or a number of successful PDCCH transmissions transmitted to the UE via a PDCCH by a base station (BS) of a wireless communication network to which the UE is connected. The PDCCH feedback module 508 can be configured to communicate, to the BS, an indicator of PDCCH decoding performance based on the number of missing PDCCH transmissions and/or the number of successful PDCCH transmissions. In some aspects, the PDCCH feedback module 508 may be configured to receive, from a base station (BS) of a wireless communication network to which the UE is connected, a reference signal. Further, the PDCCH feedback module 508 may be configured to determinee a channel quality indicator of a physical downlink control channel (PDCCH) transmission from the BS to the UE based on the received reference signal and communicate, to the BS, the channel quality indicator.

As shown, the transceiver 510 may include the modem subsystem 512 and the RF unit 514. The transceiver 510 can be configured to communicate bi-directionally with other devices, such as the UEs 115, and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PDCCH, PUSCH, PUCCH, UCI, DCI, PC5-RRC configuration, control commands/messages, reference signals (e.g., DMRS, CSI-RS, SSB)) from the modem subsystem 512 (on outbound transmissions) or of transmissions originating from another source such as a UE 115. The RF unit 514 may be further configured to perform analog beamforming in conjunction with the digital beamforming. Although shown as integrated together in transceiver 510, the modem subsystem 512 and/or the RF unit 514 may be separate devices that are coupled together at a UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., e.g., PDCCH, PUSCH, PUCCH, UCI, DCI, PC5-RRC configuration, control commands/messages, reference signals (e.g., DMRS, CSI-RS, SSB)) to the PDCCH feedback module 508 for processing. The antennas 516 may include multiple antennas of similar or different designs in order to sustain multiple transmission links.

In some aspects, the transceiver 510 is configured to communicate, to the BS, an indicator of PDCCH decoding performance based on the number of missing PDCCH transmissions and/or the number of successful PDCCH transmissions. Further, the transceiver 510 is configured to receive, from a base station (BS) of a wireless communication network to which the UE is connected, a reference signal and communicate, to the BS, a channel quality indicator of a physical downlink control channel (PDCCH) transmission from the BS to the UE based on the received reference signal.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
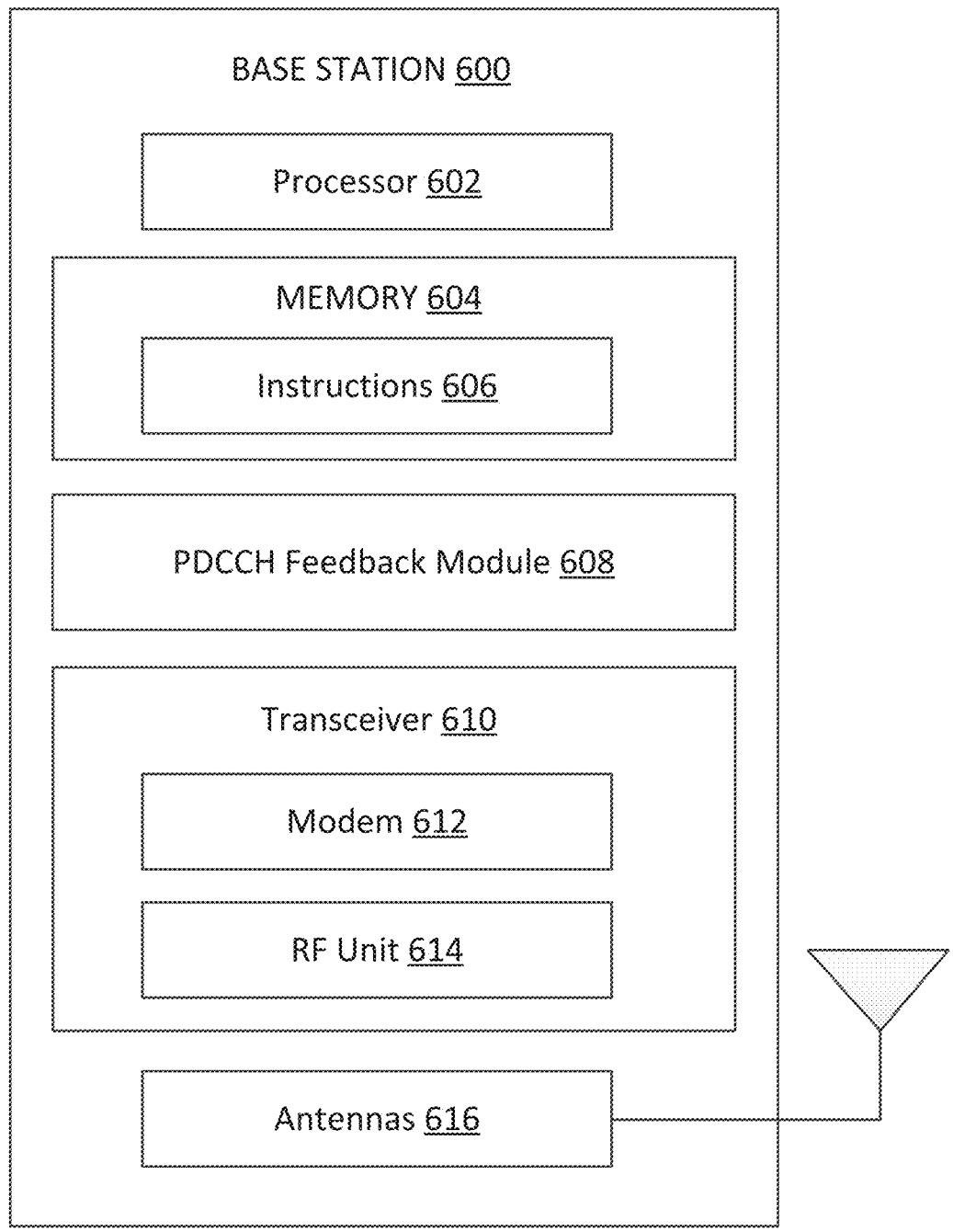
FIG. 6 is a block diagram of an exemplary base station (BS) according to aspects of the present disclosure.

FIG. 6 is a block diagram of an exemplary base station (BS) 600 according to some aspects of the present disclosure. The BS 600 may be a BS 105 discussed above in FIG. 1. As shown, the BS 600 may include a processor 602, a memory 604, a PDCCH feedback module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein in connection with aspects of the present disclosure, for example, aspects of FIGS. 1-4, 9, 10 and 11. Instructions 606 may also be referred to as program code, which may be interpreted broadly to include any type of computer-readable statement(s) as discussed above with respect to FIG. 5.

The PDCCH feedback module 608 may be implemented via hardware, software, or combinations thereof. For example, the PDCCH feedback module 608 may be implemented as a processor, circuit, and/or instructions 606 stored in the memory 604 and executed by the processor 602. In some examples, the PDCCH feedback module 608 can be integrated within the modem subsystem 612. For example, the PDCCH feedback module 608 can be implemented by a combination of software components (e.g., executed by a DSP or a general processor) and hardware components (e.g., logic gates and circuitry) within the modem subsystem 612.

The PDCCH feedback module 608 may be used for various aspects of the present disclosure, for example, aspects of FIGS. 1-4, 9, 10 and 11. The PDCCH feedback module 608 may be configured transmit, to a user equipment (UE) via a physical downlink control channel (PDCCH), PDCCH transmissions. The PDCCH feedback module 608 may also be configured to receive, from the UE, an indicator of PDCCH decoding performance for the PDCCH transmissions, wherein the indicator of PDCCH decoding performance is based on a number of missing PDCCH transmissions and/or a number of successful PDCCH transmissions. In some aspects, the PDCCH feedback module 608 may be configured to transmit, to a user equipment (UE), a reference signal; and receive, from the UE, a channel quality indicator of a physical downlink control channel (PDCCH) transmission from the BS to the UE, wherein the channel quality indicator is based on the reference signal.

As shown, the transceiver 610 may include a modem subsystem 612 and an RF unit 614. The transceiver 610 can be configured to communicate bi-directionally with other devices, such as the BSs 105. The modem subsystem 612 may be configured to modulate and/or encode the data from the memory 604 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., e.g., PDCCH, PUSCH, PUCCH, UCI, DCI, PC5-RRC configuration, control commands/messages, reference signals (e.g., DMRS, CSI-RS, SSB)) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 600 to enable the BS 600 to communicate with other devices.

The RF unit 614 may provide modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., e.g., PDCCH, PUSCH, PUCCH, UCI, DCI, PC5-RRC configuration, control commands/messages, reference signals (e.g., DMRS, CSI-RS, SSB)) to the PDCCH feedback module 608. The antennas 616 may include multiple antennas of similar or different designs in order to sustain multiple transmission links. The RF unit 614 may configure the antennas 616.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 410 can include various components, where different combinations of components can implement different RATs.

Figure 7:
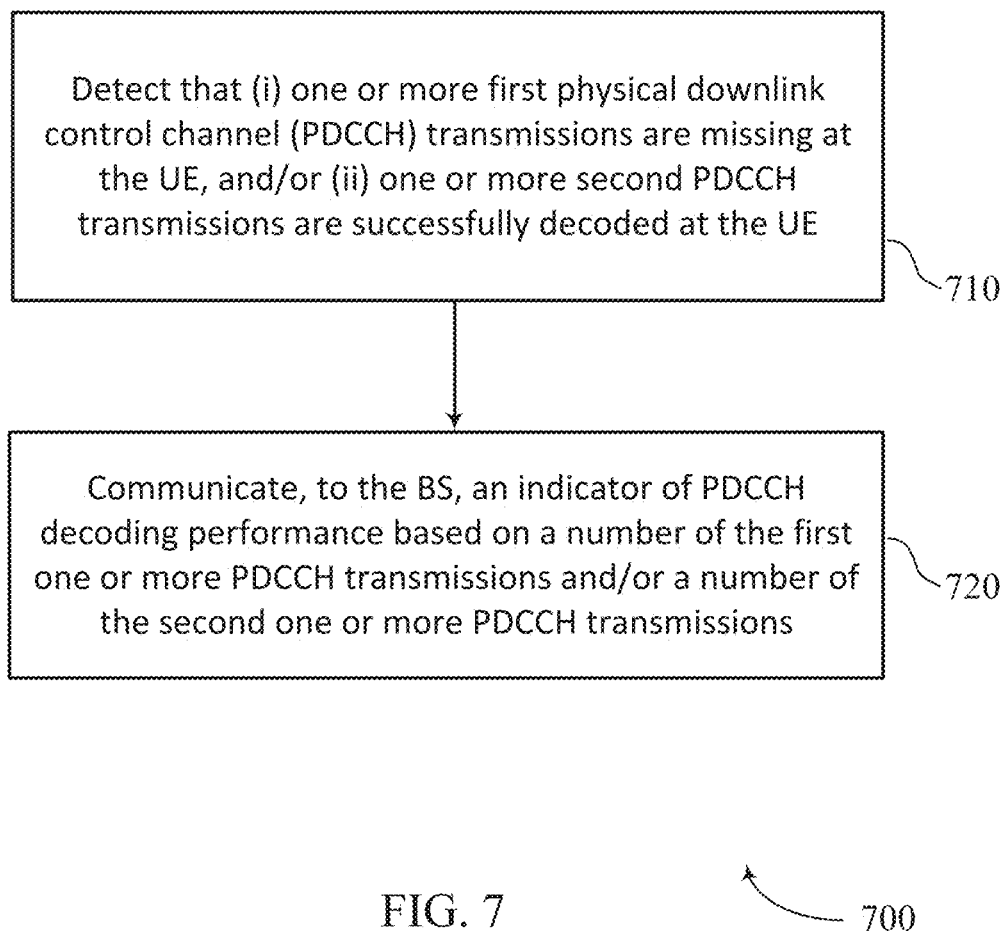
FIG. 7 illustrates a flow diagram of a wireless communication method according to some aspects of the present disclosure.

FIG. 7 is a flow diagram of a wireless communication method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the UEs 115, 500 may utilize one or more components, such as the processor 502, the memory 504, the PDCCH feedback module 508, the transceiver 510, the modem 512, and the one or more antennas 516, to execute the steps of method 700. As illustrated, the method 700 includes a number of enumerated steps, but aspects of the method 700 may include additional steps before, after, and in between the enumerated steps. In some aspects, one or more of the enumerated steps may be omitted or performed in a different order.

At block 710, the UE determines a number of missing physical downlink control channel (PDCCH) transmissions and/or a number of successful (e.g., successfully decoded) PDCCH transmissions. For example, in some aspects, the UE may detect that (i) one or more first physical downlink control channel (PDCCH) transmissions are missing at the UE, and/or (ii) one or more second PDCCH transmissions are successfully decoded at the UE. In some instances, the one or more first and/or second PDCCH transmissions may be transmitted to the UE by a base station (BS) of a wireless communications network to which the UE is connected.

The number of missing and/or successful PDCCH transmissions can be based on PDCCH transmissions transmitted to the UE via a PDCCH by a base station (BS) of a wireless communication network to which the UE is connected. In some instances, the number of missing PDCCH transmissions and/or the number of successful PDCCH transmissions are determined for a duration configured by a radio resource control (RRC) message transmitted by the BS to the UE.

At block 720, the UE communicates, to the BS, an indicator of PDCCH decoding performance based on the number of missing PDCCH transmissions and/or the number of successful PDCCH transmissions (e.g., as determined at block 710). That is, the UE may communicate to the BS an indicator of PDCCH decoding performance based on a number of the first one or more PDCCH transmissions and/or a number of the second one or more PDCCH transmissions. In some instances, the indicator of PDCCH decoding performance includes the number of missing PDCCH transmissions and/or a range including the number of missing PDCCH transmissions. In some instances, the indicator of PDCCH decoding performance includes a ratio of the number of missing PDCCH transmissions and a total number of PDCCH transmissions transmitted from the BS to the UE and/or a range including the ratio. In some instances, the indicator of PDCCH decoding performance includes the number of successful PDCCH transmissions and/or a range including the number of successful PDCCH transmissions. In some instances, the indicator of PDCCH decoding performance includes a ratio of the number of successful PDCCH transmissions and a total number of PDCCH transmissions transmitted from the BS to the UE and/or a range including the ratio.

In some aspects, the UE communicates the indicator of PDCCH decoding performance to the BS based on a periodicity configured by a RRC message received from the BS. In some aspects, the UE communicates the indicator of PDCCH decoding performance to the BS via an uplink resource configured by a RRC message received from the BS. In some aspects, the configured uplink resource is a physical uplink control channel (PUCCH) resource and the indicator of PDCCH decoding performance is transmitted by the UE to the BS in uplink control information (UCI) via the PUCCH resource. In some aspects, the configured uplink resource is a physical uplink shared channel (PUSCH) resource and the indicator of PDCCH decoding performance is transmitted by the UE to the BS in a medium access control (MAC)-control element (CE) via the PUSCH resource. In some aspects, the configured uplink resource is a physical uplink shared channel (PUSCH) resource and the indicator of PDCCH decoding performance is piggybacked on data transmitted by the UE to the BS via the PUSCH resource.

In some instances, the method 700 includes the UE receiving, from the BS, a downlink (DL) or uplink (UL) grant including a downlink assignment index (DAI). In some instances, the DAI may include the total assignment (e.g., total number of PDCCH transmissions) and the UE may determine the number of missing PDCCH transmissions and/or the number of successful PDCCH transmissions based on the DAI. In some instances, the UE determines the number of missing PDCCH transmissions and/or the number of successful PDCCH transmissions based on the DAI received from the BS.

In some instances, the method 700 includes the UE receiving from the BS downlink control information (DCI) configured to trigger the communication of the indicator of PDCCH decoding performance to the BS by the UE. In some instances, the DCI is an uplink (UL) scheduling DCI scheduling an uplink transmission via a PUSCH resource and the indicator of PDCCH decoding performance is piggybacked on the uplink transmission by the UE to the BS. In some instances, the DCI is a downlink (DL) scheduling DCI indicating a PUCCH resource via which the indicator of PDCCH decoding performance is communicated by the UE to the BS. In some instances, the DCI is a group-common DCI transmitted by the BS to a plurality of UEs including the UE. In some instances, UE periodically monitors the PDCCH for the group-common DCI. In some instances, the UE determines the number of missing PDCCH transmissions and/or the number of successful PDCCH transmissions for a duration equaling a periodicity of the periodical monitoring of the PDCCH for the group-common DCI.

In some aspects, the missing PDCCH transmissions and/or the successful PDCCH transmissions are carried by a plurality of control resource sets (CORESETs) of the PDCCH. In some aspects, the indicator of PDCCH decoding performance includes, for each CORESET, a CORESET-specific PDCCH decoding performance based on the missing PDCCH transmissions and/or the successful PDCCH transmissions carried by the CORESET. In some aspects, the indicator of PDCCH decoding performance includes a CORESET-aggregate PDCCH decoding performance corresponding to the plurality of CORESETs based on the missing PDCCH transmissions and/or the successful PDCCH transmissions carried by the plurality of CORESETs.

Figure 8:
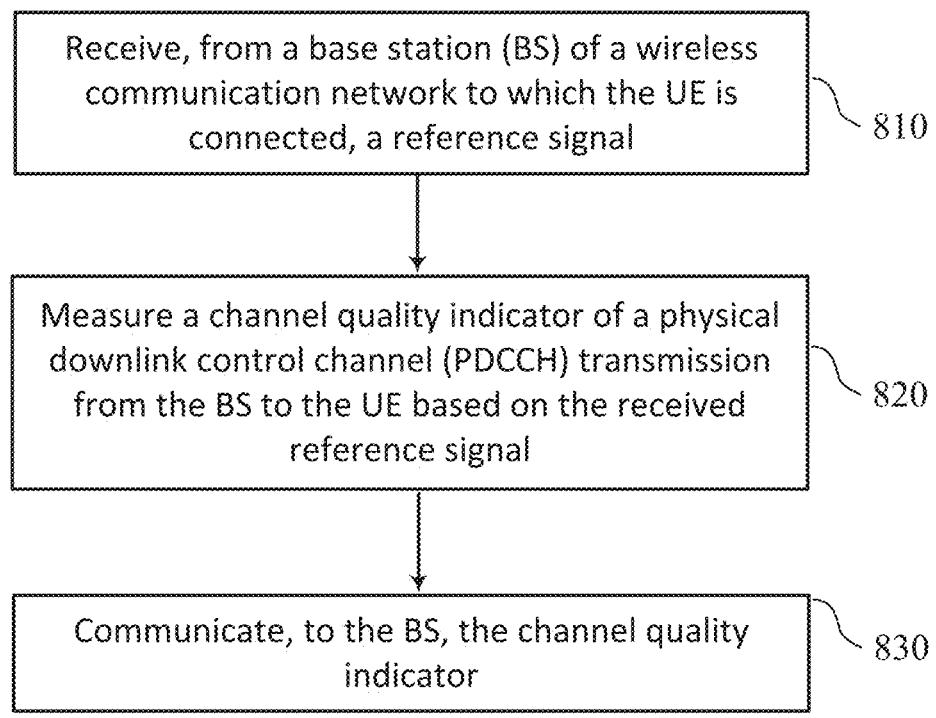
FIG. 8 illustrates a flow diagram of a wireless communication method according to some aspects of the present disclosure.

FIG. 8 is a flow diagram of a wireless communication method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UEs 115, 500 may utilize one or more components, such as the processor 502, the memory 504, the PDCCH feedback module 508, the transceiver 510, the modem 512, and the one or more antennas 516, to execute the steps of method 800. As illustrated, the method 800 includes a number of enumerated steps, but aspects of the method 800 may include additional steps before, after, and in between the enumerated steps. In some aspects, one or more of the enumerated steps may be omitted or performed in a different order.

At block 810, the UE receives, from a base station (BS) of a wireless communication network to which the UE is connected, a reference signal. In some aspects, the reference signal can be a demodulation reference signal (DMRS). In some aspects, the reference signal can be a channel state information (CSI)-reference signal (RS). In some aspects, the reference signal can be a synchronization signal block (SSB) signal.

At block 820, the UE determines a channel quality indicator of a physical downlink control channel (PDCCH) transmission from the BS to the UE based on the received reference signal. For example, the UE may measure the channel quality indicator based on the received reference signal. In some aspects, when the reference signal is DMRS, the channel quality indicator can be a reference signal received power (RSRP) of control channel elements of a PDCCH carrying the DMRS. In some aspects, the channel quality indicator can be a hypothetical block error rate (BLER) of the PDCCH transmission determined based on the received reference signal. In some aspects, the channel quality indicator can be an aggregation level (AL) of the PDCCH transmission indicating a number of successive control channel elements carrying the PDCCH transmission when a BLER of the PDCCH transmission is no greater than a threshold BLER. In some aspects, the BLER and/or the AL of the PDCCH transmission can be determined based on a physical layer parameter of a PDCCH carrying the PDCCH transmission including a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of a DCI configured to trigger the communicating the channel quality indicator.

At block 830, the UE communicates, to the BS, the channel quality indicator. In some aspects, the communicating to the BS the channel quality indicator based on the reference signal includes communicating to the BS (a) an aggregation level (AL) of the PDCCH transmission and/or (b) a block error rate (BLER) of the PDCCH transmission, determined based on a physical layer parameter of a PDCCH carrying the PDCCH transmission. In some aspects, the physical layer parameter of the PDCCH includes a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of the DCI. In some aspects, the communicating the channel quality indicator occurs with a periodicity configured by a radio resource control (RRC) message transmitted by the BS to the UE, the PDCCH transmission being a most recent PDCCH transmission from the BS to the UE prior to the communicating the channel quality indicator. In some aspects, the communicating the channel quality indicator occurs via an uplink resource configured by a last RRC message transmitted by the BS to the UE, the PDCCH transmission being a most recent PDCCH transmission from the BS to the UE prior to the communicating the channel quality indicator. In some aspects, the uplink resource can be a physical uplink control channel (PUCCH) resource and the channel quality indicator is carried on an uplink control information (UCI) transmitted from the UE to the BS via the PUCCH resource, the PDCCH transmission being a most recent PDCCH transmission from the BS to the UE prior to the communicating the channel quality indicator. In some aspects, the uplink resource is a physical uplink shared channel (PUSCH) resource and the channel quality indicator can be carried on a medium access control (MAC)-control element (CE) transmitted from the UE to the BS via the PUSCH resource, the PDCCH transmission being a most recent PDCCH transmission from the BS to the UE prior to the communicating the channel quality indicator. In some aspects, the uplink resource is a PUSCH resource and the channel quality indicator can be piggybacked on data transmitted from the UE to the BS via the PUSCH resource, the PDCCH transmission being a most recent PDCCH transmission from the BS to the UE prior to the communicating the channel quality indicator.

In some aspects, the PDCCH transmission can be configured to schedule an uplink transmission via a PUSCH resource, and the channel quality indicator is piggybacked on the uplink transmission. In some aspects, the PDCCH transmission can include an indication indicating a PUCCH resource via which the communicating the channel quality indicator occurs. In some aspects, the PDCCH transmission can be carried by a plurality of CORESETs of the PDCCH; and the channel quality indicator includes, for each CORESET, a CORESET-specific channel quality indicator corresponding to that CORESET and based on the reference signal. In some aspects, the PDCCH transmission can be carried by a plurality of CORESETs of the PDCCH; and the channel quality indicator includes a CORESET-aggregate channel quality indicator corresponding to the plurality of CORESETs and based on the reference signal. In some aspects, the PDCCH transmission can be carried by a CORESET of the PDCCH; and the reference signal can be a CSI-RS or a SSB signal that is quasi-colocated with the CORESET, and the channel quality indicator is determined based on a measurement performed on the CSI-RS or the SSB signal, respectively. Some aspects of method 800 further comprise receiving from the BS a DCI configured to trigger the communicating the channel quality indicator from the UE to the BS.

Figure 9:
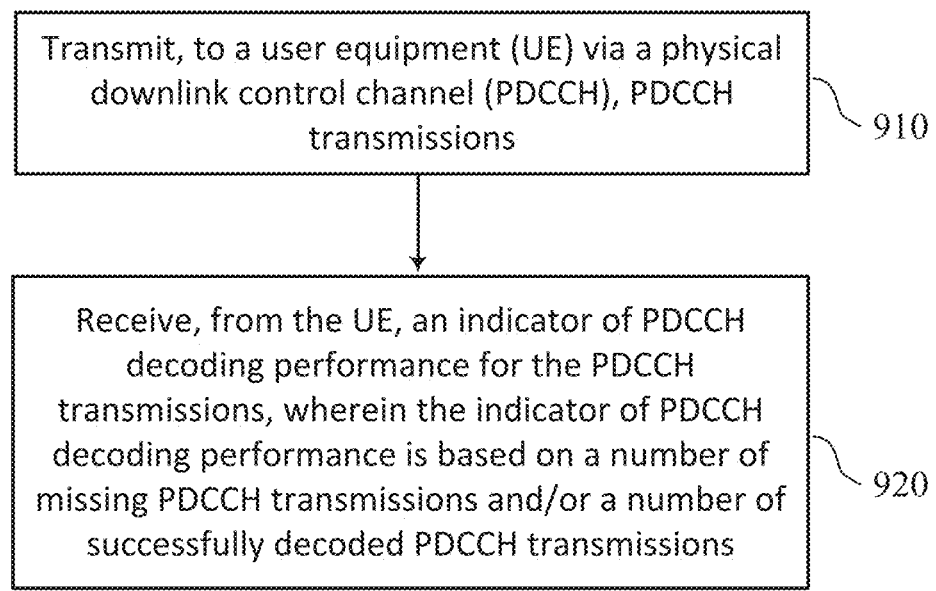
FIG. 9 illustrates a flow diagram of a wireless communication method according to some aspects of the present disclosure.

FIG. 9 is a flow diagram of a wireless communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the BSs 105, 600 may utilize one or more components, such as the processor 602, the memory 604, the PDCCH feedback module 608, the transceiver 610, the modem 612, and the one or more antennas 616, to execute the steps of method 900. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, the BS transmits to a user equipment (UE) via a physical downlink control channel (PDCCH), PDCCH transmissions.

At block 920, the BS receives, from the UE, an indicator of PDCCH decoding performance for the PDCCH transmissions, wherein the indicator of PDCCH decoding performance is based on a number of missing PDCCH transmissions and/or a number of successful PDCCH transmissions. In some aspects, the indicator of PDCCH decoding performance includes the number of missing PDCCH transmissions and/or a range including the number of missing PDCCH transmissions. In some aspects, the indicator of PDCCH decoding performance includes a ratio of the number of missing PDCCH transmissions and a total number of PDCCH transmissions transmitted from the BS to the UE and/or a range including the ratio. In some aspects, the indicator of PDCCH decoding performance includes the number of successful PDCCH transmissions and/or a range including the number of successful PDCCH transmissions. In some aspects, the indicator of PDCCH decoding performance includes a ratio of the number of successful PDCCH transmissions and a total number of PDCCH transmissions transmitted from the BS to the UE and/or a range including the ratio.

In some aspects of method 900, the BS transmits, to the UE, a downlink (DL) or uplink (UL) grant including a downlink assignment index (DAI). In some instances, the DAI may include the total assignment (e.g., total number of PDCCH transmissions) and the UE may determine the number of missing PDCCH transmissions and/or the number of successful PDCCH transmissions based on the DAI. Further, in some aspects, the BS transmits, to the UE via a radio resource control (RRC) message, an indication of a duration for determining the number of missing PDCCH transmissions and/or the number of successful PDCCH transmissions. In some aspects, the UE transmits, to the UE via a radio resource control (RRC) message, an indication of a periodicity, wherein the receiving the indicator of PDCCH decoding performance is based on the periodicity. In some aspects, the BS transmits to the UE via a radio resource control (RRC) message, an indication of an uplink resource, wherein the receiving the indicator of PDCCH decoding performance includes receiving the indicator of PDCCH decoding performance via the uplink resource.

In some aspects, the uplink resource is a physical uplink control channel (PUCCH) resource; and the receiving the indicator of PDCCH decoding performance includes receiving the indicator of PDCCH decoding performance in uplink control information (UCI) via the PUCCH resource. In some aspects, the uplink resource is a physical uplink shared channel (PUSCH) resource; and the receiving the indicator of PDCCH decoding performance includes receiving the indicator of PDCCH decoding performance in a medium access control (MAC)-control element (CE) via the PUSCH resource. In some aspects, the uplink resource is a physical uplink shared channel (PUSCH) resource; and the receiving the indicator of PDCCH decoding performance includes receiving the indicator of PDCCH decoding performance piggybacked on data via the PUSCH resource.

In some aspects of method 900, the BS transmits, to the UE, downlink control information (DCI) configured to trigger the UE to transmit the indicator of PDCCH decoding performance to the BS. In some aspects, the DCI is an uplink (UL) scheduling DCI scheduling an uplink transmission via a PUSCH resource; and the receiving the indicator of PDCCH decoding performance includes receiving the indicator of PDCCH decoding performance piggybacked on the uplink transmission. In some aspects, the DCI is a downlink (DL) scheduling DCI indicating a PUCCH resource; and the receiving the indicator of PDCCH decoding performance includes receiving the indicator of PDCCH decoding performance via the PUCCH resource. In some aspects, the DCI is a group-common DCI transmitted by the BS to a plurality of UEs including the UE; and the indicator of PDCCH decoding performance is based on the number of missing PDCCH transmissions and/or the number of successful PDCCH transmissions in a duration equaling a periodicity associated with the UE monitoring the PDCCH for the group-common DCI.

In some aspects, the missing PDCCH transmissions and/or the successful PDCCH transmissions are carried by a plurality of control resource sets (CORESETs) of the PDCCH; and the indicator of PDCCH decoding performance includes, for each CORESET, a CORESET-specific PDCCH decoding performance based on the missing PDCCH transmissions and/or the successful PDCCH transmissions carried by the CORESET. In some aspects, the missing PDCCH transmissions and/or the successful PDCCH transmissions are carried by a plurality of CORESETs of the PDCCH; and the indicator of PDCCH decoding performance includes a CORESET-aggregate PDCCH decoding performance corresponding to the plurality of CORESETs based on the missing PDCCH transmissions and/or the successful PDCCH transmissions carried by the plurality of CORESETs.

Figure 10:
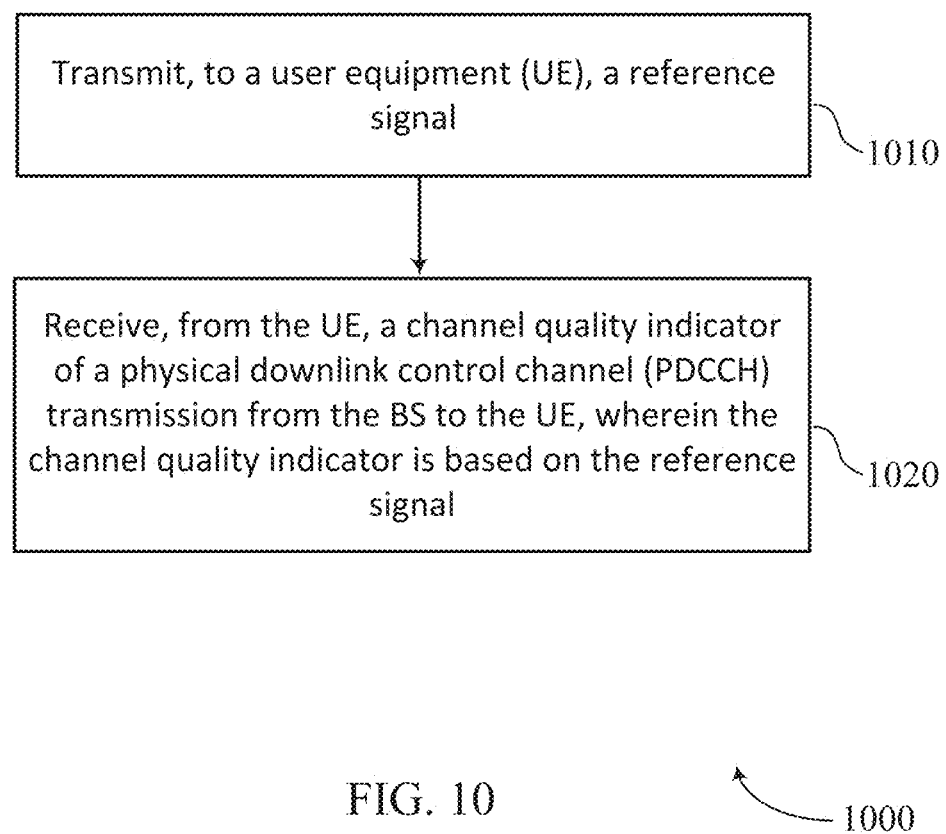
FIG. 10 illustrates a flow diagram of a wireless communication method according to some aspects of the present disclosure.

FIG. 10 is a flow diagram of a wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the BSs 105, 600 may utilize one or more components, such as the processor 602, the memory 604, the PDCCH feedback module 608, the transceiver 610, the modem 612, and the one or more antennas 616, to execute the steps of method 1000. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the BS transmits, to a user equipment (UE), a reference signal. In some aspects, the reference signal can be a demodulation reference signal (DMRS). In some aspects, the reference signal can be a channel state information (CSI)-reference signal (RS). In some aspects, the reference signal can be a synchronization signal block (SSB) signal.

At block 1020, the BS receives, from the UE, a channel quality indicator of a physical downlink control channel (PDCCH) transmission from the BS to the UE, wherein the channel quality indicator is based on the reference signal. In some aspects, when the reference signal is DMRS, the channel quality indicator can be a reference signal received power (RSRP) of control channel elements of a PDCCH carrying the DMRS. In some aspects, the channel quality indicator can be a hypothetical block error rate (BLER) of the PDCCH transmission determined based on the received reference signal. In some aspects, the channel quality indicator can be an aggregation level (AL) of the PDCCH transmission indicating a number of successive control channel elements carrying the PDCCH transmission when a BLER of the PDCCH transmission is no greater than a threshold BLER. In some aspects, the BLER and/or the AL of the PDCCH transmission can be determined based on a physical layer parameter of a PDCCH carrying the PDCCH transmission including a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of a DCI configured to trigger the communicating the channel quality indicator.

In some aspects of method 1000, the BS transmits, to the UE, a DCI configured to trigger communication of the channel quality indicator from the UE to the BS. In some aspects, the receiving the channel quality indicator based on the reference signal includes receiving, from the UE, (a) an aggregation level (AL) of the PDCCH transmission and/or (b) a block error rate (BLER) of the PDCCH transmission, determined based on a physical layer parameter of a PDCCH carrying the PDCCH transmission. In some aspects, the physical layer parameter of the PDCCH includes a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of the DCI.

In some aspects of method 1000, the BS transmitting, to the UE via a radio resource control (RRC) message, an indication of a periodicity, wherein the receiving the channel quality indicator includes receiving, from the UE, the channel quality indicator based on the periodicity. In some aspects, transmitting, to the UE via a radio resource control (RRC) message, an indication of an uplink resource, wherein the receiving the channel quality indicator includes receiving, from the UE, the channel quality indicator via the uplink resource. In some aspects, the uplink resource is a physical uplink control channel (PUCCH) resource; and the receiving the channel quality indicator includes receiving, from the UE, the channel quality indicator in an uplink control information (UCI) via the PUCCH resource. In some aspects, the uplink resource is a physical uplink shared channel (PUSCH) resource; and the receiving the channel quality indicator includes: receiving, from the UE, the channel quality indicator in a medium access control (MAC)-control element (CE) via the PUSCH resource. In some aspects, the uplink resource is a physical uplink shared channel (PUSCH) resource; and the receiving the channel quality indicator includes: receiving, from the UE, the channel quality indicator piggybacked to data transmitted from the UE to the BS via the PUSCH resource. In some aspects, the PDCCH transmission is configured to schedule an uplink transmission via a PUSCH resource; and the receiving the channel quality indicator includes: receiving, from the UE, the channel quality indicator piggybacked on the uplink transmission.

In some aspects, the PDCCH transmission includes an indication indicating a PUCCH resource; and the receiving the channel quality indicator includes receiving, from the UE, the channel quality indicator via the PUCCH resource. In some aspects, the PDCCH transmission is carried by a plurality of CORESETs of the PDCCH; and the channel quality indicator includes, for each CORESET, a CORESET-specific channel quality indicator corresponding to the CORESET. In some aspects, the PDCCH transmission is carried by a plurality of CORESETs of the PDCCH; and the channel quality indicator includes a CORESET-aggregate channel quality indicator corresponding to the plurality of CORESETs. In some aspects, the PDCCH transmission is carried by a CORESET of the PDCCH; the reference signal is a channel state information (CSI)-reference signal (RS) or a synchronization signal block (SSB) signal that is quasi-colocated with the CORESET; and the channel quality indicator is based on a measurement performed on the CSI-RS or the SSB signal.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Recitations of Some Aspects of the Present Disclosure

Aspect 1: A method of wireless communication performed by a user equipment (UE), the method comprising: detecting that (i) one or more first physical downlink control channel (PDCCH) transmissions are missing at the UE, and/or (ii) one or more second PDCCH transmissions are successfully decoded at the UE, the one or more first and/or second PDCCH transmissions transmitted to the UE by a base station (BS) of a wireless communications network to which the UE is connected; and communicating, to the BS, an indicator of PDCCH decoding performance based on a number of the first one or more PDCCH transmissions and/or a number of the second one or more PDCCH transmissions.

Aspect 2: The method of aspect 1, further comprising: receiving, from the BS, a downlink (DL) or uplink (UL) grant including a downlink assignment index (DAI), wherein the detecting is based on the DAI.

Aspect 3: The method of aspect 1 or 2, wherein the indicator of PDCCH decoding performance includes the number of the one or more first PDCCH transmissions and/or a range including the number of the one or more first PDCCH transmissions.

Aspect 4: The method of any of aspects 1-3, wherein the indicator of PDCCH decoding performance includes (i) a ratio of the number of the one or more first PDCCH transmissions and a total number of PDCCH transmissions transmitted by the BS to the UE and/or (ii) a range including the ratio.

Aspect 5: The method of any of aspects 1-4, wherein the indicator of PDCCH decoding performance includes the number of the one or more second PDCCH transmissions and/or a range including the number of the one or more second PDCCH transmissions.

Aspect 6: The method of any of aspects 1-5, wherein the indicator of PDCCH decoding performance includes (i) a ratio of the number of the one or more second PDCCH transmissions and a total number of PDCCH transmissions transmitted by the BS to the UE and/or (ii) a range including the ratio.

Aspect 7: The method of any of aspects 1-6, wherein the number of the one or more first PDCCH transmissions and/or the number of the one or more second PDCCH transmissions are determined for a duration configured by a radio resource control (RRC) message transmitted by the BS to the UE.

Aspect 8: The method of any of aspects 1-7, wherein the communicating the indicator of PDCCH decoding performance occurs with a periodicity configured by a RRC message transmitted by the BS to the UE.

Aspect 9: The method of any of aspects 1-8, wherein the communicating the indicator of PDCCH decoding performance occurs via an uplink resource configured by a RRC message transmitted by the BS to the UE.

Aspect 10: The method of aspect 9, wherein the uplink resource is a physical uplink control channel (PUCCH) resource and the indicator of PDCCH decoding performance is carried on an uplink control information (UCI) transmitted from the UE to the BS via the PUCCH resource.

Aspect 11: The method of aspect 9, wherein the uplink resource is a physical uplink shared channel (PUSCH) resource and the indicator of PDCCH decoding performance is carried on a medium access control (MAC)-control element (CE) transmitted from the UE to the BS via the PUSCH resource.

Aspect 12: The method of aspect 9, wherein the uplink resource is a physical uplink shared channel (PUSCH) resource and the indicator of PDCCH decoding performance is piggybacked on data transmitted from the UE to the BS via the PUSCH resource.

Aspect 13: The method of any of aspects 1-12, further comprising: receiving from the BS a downlink control information (DCI) configured to trigger the communicating the indicator of PDCCH decoding performance from the UE to the BS.

Aspect 14: The method of aspect 13, wherein the DCI is an uplink (UL) scheduling DCI scheduling an uplink transmission via a PUSCH resource, and the indicator of PDCCH decoding performance is piggybacked on the uplink transmission.

Aspect 15: The method of aspect 13, wherein the DCI is a downlink (DL) scheduling DCI indicating a PUCCH resource via which the communicating the indicator of PDCCH decoding performance occurs.

Aspect 16: The method of aspect 13, wherein the DCI is a group-common DCI transmitted by the BS to a plurality of UEs including the UE, the method further comprising: periodically monitoring the PDCCH for the group-common DCI, wherein the number of the one or more first PDCCH transmissions and/or the number of the one or more second PDCCH transmissions are determined for a duration equaling a periodicity of the periodical monitoring of the PDCCH.

Aspect 17: The method of any of aspects 1-16, wherein: the one or more first PDCCH transmissions and/or the one or more second PDCCH transmissions are carried by a plurality of control resource sets (CORESETs) of the PDCCH; and the indicator of PDCCH decoding performance includes, for each CORESET, a CORESET-specific PDCCH decoding performance based on the one or more first PDCCH transmissions and/or the one or more second PDCCH transmissions carried by the CORESET.

Aspect 18: The method of any of aspects 1-17, wherein: the one or more first PDCCH transmissions and/or the one or more second PDCCH transmissions are carried by a plurality of CORESETs of the PDCCH; and the indicator of PDCCH decoding performance includes a CORESET-aggregate PDCCH decoding performance corresponding to the plurality of CORESETs based on the one or more first PDCCH transmissions and/or the one or more second PDCCH transmissions carried by the plurality of CORESETs.

Aspect 18a: The method of any of aspects 1-18, wherein the one or more first PDCCH transmissions and/or the one or more second PDCCH transmissions are carried by a plurality of control resource sets (CORESETs) of the PDCCH, each CORESET configured with a plurality of transmission configuration indication (TCI) states, the method further comprising: communicating, to the BS, an indication of a preferred TCI state of the plurality of TCI states to use for the one or more first PDCCH transmissions and/or the one or more second PDCCH transmissions.

Aspect 19: A method of wireless communication performed by a user equipment (UE), the method comprising: receiving, from a base station (BS) of a wireless communication network to which the UE is connected, a reference signal; measuring a channel quality indicator of a physical downlink control channel (PDCCH) transmission from the BS to the UE based on the received reference signal; and communicating, to the BS, the channel quality indicator.

Aspect 20: The method of aspect 19, wherein the reference signal is a demodulation reference signal (DMRS).

Aspect 21: The method of aspect 20, wherein the channel quality indicator is a reference signal received power (RSRP) of control channel elements of a PDCCH carrying the DMRS.

Aspect 22: The method of any of aspects 19-21, wherein the reference signal is a channel state information (CSI)-reference signal (RS).

Aspect 23: The method of any of aspects 19-22, wherein the reference signal is a synchronization signal block (SSB) signal.

Aspect 24: The method of any of aspects 19-23, wherein the channel quality indicator is a hypothetical block error rate (BLER) of the PDCCH transmission determined based on the received reference signal.

Aspect 25: The method of any of aspects 19-24, wherein the channel quality indicator is an aggregation level (AL) of the PDCCH transmission indicating a number of successive control channel elements carrying the PDCCH transmission when a BLER of the PDCCH transmission is no greater than a threshold BLER.

Aspect 26: The method of aspect 24 or 25, wherein the BLER of the PDCCH transmission is determined based on a physical layer parameter of a PDCCH carrying the PDCCH transmission including a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of a DCI configured to trigger the communicating the channel quality indicator.

Aspect 27: The method of aspect 25, wherein the AL of the PDCCH transmission is computed based on a physical layer parameter of a PDCCH carrying the PDCCH transmission including a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of a DCI configured to trigger the communicating the channel quality indicator.

Aspect 28: The method of any of aspects 19-27, further comprising: receiving, from the BS, a DCI configured to trigger the communicating the channel quality indicator from the UE to the BS.

Aspect 29: The method of any of aspects 19-28, wherein: the measuring includes computing (a) an aggregation level (AL) of the PDCCH transmission and/or (b) a block error rate (BLER) of the PDCCH transmission based on a physical layer parameter of a PDCCH carrying the PDCCH transmission.

Aspect 30: The method of any of aspects 19-29, wherein the physical layer parameter of the PDCCH includes a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of the DCI.

Aspect 31: The method of any of aspects 19-30, wherein the communicating the channel quality indicator occurs with a periodicity configured by a radio resource control (RRC) message transmitted by the BS to the UE, the PDCCH transmission being a most recent PDCCH transmission from the BS to the UE prior to the communicating the channel quality indicator.

Aspect 32: The method of any of aspects 19-31, wherein the communicating the channel quality indicator occurs via an uplink resource configured by a last RRC message transmitted by the BS to the UE prior to the communicating the channel quality indicator, the PDCCH transmission being a most recent PDCCH transmission from the BS to the UE prior to the communicating the channel quality indicator.

Aspect 33: The method of aspect 32, wherein the uplink resource is a physical uplink control channel (PUCCH) resource and the channel quality indicator is carried on an uplink control information (UCI) transmitted from the UE to the BS via the PUCCH resource, the PDCCH transmission being a most recent PDCCH transmission from the BS to the UE prior to the communicating the channel quality indicator.

Aspect 34: The method of aspect 32, wherein the uplink resource is a physical uplink shared channel (PUSCH) resource and the channel quality indicator is carried on a medium access control (MAC)-control element (CE) transmitted from the UE to the BS via the PUSCH resource, the PDCCH transmission being a most recent PDCCH transmission from the BS to the UE prior to the communicating the channel quality indicator.

Aspect 35: The method of aspect 32, wherein the uplink resource is a PUSCH resource and the channel quality indicator is piggybacked in data transmitted from the UE to the BS via the PUSCH resource, the PDCCH transmission being a most recent PDCCH transmission from the BS to the UE prior to the communicating the channel quality indicator.

Aspect 36: The method of any of aspects 19-35, wherein the PDCCH transmission is configured to schedule an uplink transmission via a PUSCH resource, and the channel quality indicator is piggybacked in the uplink transmission.

Aspect 37: The method of any of aspects 19-36, wherein the PDCCH transmission includes a resource indicator indicating a PUCCH resource via which the communicating the channel quality indicator occurs.

Aspect 38: The method of any of aspects 19-37, wherein: the PDCCH transmission is carried by a plurality of CORESETs of the PDCCH; and the channel quality indicator includes, for each CORESET, a CORESET-specific channel quality indicator corresponding to that CORESET and based on the reference signal.

Aspect 39: The method of any of aspects 19-38, wherein: the PDCCH transmission is carried by a plurality of CORESETs of the PDCCH; and the channel quality indicator includes a CORESET-aggregate channel quality indicator corresponding to the plurality of CORESETs and based on the reference signal.

Aspect 40: The method of any of aspects 19-39, wherein: the PDCCH transmission is carried by a CORESET of the PDCCH; the reference signal is a channel state information (CSI)-reference signal (RS) or a synchronization signal block (SSB) signal that is quasi-colocated with the CORESET; and the channel quality indicator is determined based on a measurement performed on the CSI-RS or the SSB signal.

Aspect 41: A method of wireless communication performed by a base station (BS), the method comprising: transmitting, to a user equipment (UE) via a physical downlink control channel (PDCCH), PDCCH transmissions; and receiving, from the UE, an indicator of PDCCH decoding performance for the PDCCH transmissions, wherein the indicator of PDCCH decoding performance is based on a number of PDCCH transmissions missing at the UE and/or a number of PDCCH transmissions successfully decoded at the UE.

Aspect 42: The method of aspect 41: further comprising: transmitting, to the UE, a downlink (DL) or uplink (UL) grant including a downlink assignment index (DAI).

Aspect 43: The method of aspect 41 or 42, wherein the indicator of PDCCH decoding performance includes the number of missing PDCCH transmissions and/or a range including the number of missing PDCCH transmissions.

Aspect 44: The method of any of aspects 41-43, wherein the indicator of PDCCH decoding performance includes a ratio of the number of missing PDCCH transmissions and a total number of PDCCH transmissions transmitted from the BS to the UE and/or a range including the ratio.

Aspect 45: The method of any of aspects 41-44, wherein the indicator of PDCCH decoding performance includes the number of successful PDCCH transmissions and/or a range including the number of successful PDCCH transmissions.

Aspect 46: The method of any of aspects 41-45, wherein the indicator of PDCCH decoding performance includes a ratio of the number of successful PDCCH transmissions and a total number of PDCCH transmissions transmitted from the BS to the UE and/or a range including the ratio.

Aspect 47: The method of any of aspects 41-46, further comprising: transmitting, to the UE via a radio resource control (RRC) message, an indication of a duration for determining the number of missing PDCCH transmissions and/or the number of successful PDCCH transmissions.

Aspect 48: The method of any of aspects 41-47, further comprising: transmitting, to the UE via a radio resource control (RRC) message, an indication of a periodicity, wherein the receiving the indicator of PDCCH decoding performance is based on the periodicity.

Aspect 49: The method of any of aspects 41-48, further comprising: transmitting, to the UE via a radio resource control (RRC) message, an indication of an uplink resource, wherein the receiving the indicator of PDCCH decoding performance includes receiving the indicator of PDCCH decoding performance via the uplink resource.

Aspect 50: The method of aspect 49, wherein: the uplink resource is a physical uplink control channel (PUCCH) resource; and the receiving the indicator of PDCCH decoding performance includes receiving the indicator of PDCCH decoding performance in uplink control information (UCI) via the PUCCH resource.

Aspect 51: The method of aspect 49, wherein: the uplink resource is a physical uplink shared channel (PUSCH) resource; and the receiving the indicator of PDCCH decoding performance includes receiving the indicator of PDCCH decoding performance in a medium access control (MAC)-control element (CE) via the PUSCH resource.

Aspect 52: The method of aspect 49, wherein: the uplink resource is a physical uplink shared channel (PUSCH) resource; and the receiving the indicator of PDCCH decoding performance includes receiving the indicator of PDCCH decoding performance piggybacked on data via the PUSCH resource.

Aspect 53: The method of any of aspects 41-52, further comprising: transmitting, to the UE, downlink control information (DCI) configured to trigger the UE to transmit the indicator of PDCCH decoding performance to the BS.

Aspect 54: The method of aspect 53, wherein: the DCI is an uplink (UL) scheduling DCI scheduling an uplink transmission via a PUSCH resource; and the receiving the indicator of PDCCH decoding performance includes receiving the indicator of PDCCH decoding performance piggybacked on the uplink transmission.

Aspect 55: The method of aspect 53, wherein: the DCI is a downlink (DL) scheduling DCI indicating a PUCCH resource; and the receiving the indicator of PDCCH decoding performance includes receiving the indicator of PDCCH decoding performance via the PUCCH resource.

Aspect 56: The method of aspect 53, wherein: the DCI is a group-common DCI transmitted by the BS to a plurality of UEs including the UE; and the indicator of PDCCH decoding performance is based on the number of missing PDCCH transmissions and/or the number of successful PDCCH transmissions in a duration equaling a periodicity associated with the UE monitoring the PDCCH for the group-common DCI.

Aspect 57: The method of any of aspects 41-56, wherein: the missing PDCCH transmissions and/or the successful PDCCH transmissions are carried by a plurality of control resource sets (CORESETs) of the PDCCH; and the indicator of PDCCH decoding performance includes, for each CORESET, a CORESET-specific PDCCH decoding performance based on the missing PDCCH transmissions and/or the successful PDCCH transmissions carried by the CORESET.

Aspect 58: The method of any of aspects 41-57, wherein: the missing PDCCH transmissions and/or the successful PDCCH transmissions are carried by a plurality of CORESETs of the PDCCH; and the indicator of PDCCH decoding performance includes a CORESET-aggregate PDCCH decoding performance corresponding to the plurality of CORESETs based on the missing PDCCH transmissions and/or the successful PDCCH transmissions carried by the plurality of CORESETs.

Aspect 59: A method of wireless communication performed by a base station (BS), the method comprising: transmitting, to a user equipment (UE), a reference signal; and receiving, from the UE, a channel quality indicator of a physical downlink control channel (PDCCH) transmission from the BS to the UE, wherein the channel quality indicator is based on the reference signal.

Aspect 60: The method of aspect 59, wherein the reference signal is a demodulation reference signal (DMRS).

Aspect 61: The method of aspect 59 or 60, wherein the channel quality indicator is a reference signal received power (RSRP) of control channel elements of a PDCCH carrying the DMRS.

Aspect 62: The method of any of aspects 59-61, wherein the reference signal is a channel state information (CSI)-reference signal (RS).

Aspect 63: The method of any of aspects 59-62, wherein the reference signal is a synchronization signal block (SSB) signal.

Aspect 64: The method of any of aspects 59-63, wherein the channel quality indicator is a hypothetical block error rate (BLER) of the PDCCH transmission determined based on the reference signal.

Aspect 65: The method of any of aspects 59-64, wherein the channel quality indicator is an aggregation level (AL) of the PDCCH transmission indicating a number of successive control channel elements carrying the PDCCH transmission when a block error rate (BLER) of the PDCCH transmission is no greater than a threshold BLER.

Aspect 66: The method of aspect 64 or 65, wherein the BLER of the PDCCH transmission is determined based on a physical layer parameter of a PDCCH carrying the PDCCH transmission including a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of a DCI configured to trigger communication of the channel quality indicator.

Aspect 67: The method of aspect 65, wherein the AL of the PDCCH transmission is determined based on a physical layer parameter of a PDCCH carrying the PDCCH transmission including a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of a DCI configured to trigger communication of the channel quality indicator.

Aspect 68: The method of any of aspects 59-67, further comprising: transmitting, to the UE, a DCI configured to trigger communication of the channel quality indicator from the UE to the BS.

Aspect 69: The method of aspect 68, wherein the receiving the channel quality indicator based on the reference signal includes: receiving, from the UE, (a) an aggregation level (AL) of the PDCCH transmission and/or (b) a block error rate (BLER) of the PDCCH transmission, determined based on a physical layer parameter of a PDCCH carrying the PDCCH transmission.

Aspect 70: The method of aspect 69, wherein the physical layer parameter of the PDCCH includes a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of the DCI.

Aspect 71: The method of any of aspects 59-70, further comprising: transmitting, to the UE via a radio resource control (RRC) message, an indication of a periodicity, wherein the receiving the channel quality indicator includes receiving, from the UE, the channel quality indicator based on the periodicity.

Aspect 72: The method of any of aspects 59-71, further comprising: transmitting, to the UE via a radio resource control (RRC) message, an indication of an uplink resource, wherein the receiving the channel quality indicator includes: receiving, from the UE, the channel quality indicator via the uplink resource.

Aspect 73: The method of aspect 72, wherein: the uplink resource is a physical uplink control channel (PUCCH) resource, the receiving the channel quality indicator including receiving, from the UE, the channel quality indicator in an uplink control information (UCI) via the PUCCH resource.

Aspect 74: The method of aspect 72, wherein: the uplink resource is a physical uplink shared channel (PUSCH) resource, the receiving the channel quality indicator including: receiving, from the UE, the channel quality indicator in a medium access control (MAC)-control element (CE) via the PUSCH resource.

Aspect 75: The method of aspect 72, wherein: the uplink resource is a physical uplink shared channel (PUSCH) resource, the receiving the channel quality indicator including: receiving, from the UE, the channel quality indicator piggybacked to data transmitted from the UE to the BS via the PUSCH resource.

Aspect 76: The method of any of aspects 59-75, wherein: the PDCCH transmission is configured to schedule an uplink transmission via a PUSCH resource; and the receiving the channel quality indicator includes: receiving, from the UE, the channel quality indicator piggybacked on the uplink transmission.

Aspect 77: The method of any of aspects 59-76, wherein: the PDCCH transmission includes an indication indicating a PUCCH resource; and the receiving the channel quality indicator includes: receiving, from the UE, the channel quality indicator via the PUCCH resource.

Aspect 78: The method of any of aspects 59-77, wherein: the PDCCH transmission is carried by a plurality of CORESETs of the PDCCH; and the channel quality indicator includes, for each CORESET, a CORESET-specific channel quality indicator corresponding to the CORESET.

Aspect 79: The method of any of aspects 59-78, wherein: the PDCCH transmission is carried by a plurality of CORESETs of the PDCCH; and the channel quality indicator includes a CORESET-aggregate channel quality indicator corresponding to the plurality of CORESETs.

Aspect 80: The method of any of aspects 59-79, wherein: the PDCCH transmission is carried by a CORESET of the PDCCH; the reference signal is a channel state information (CSI)-reference signal (RS) or a synchronization signal block (SSB) signal that is quasi-colocated with the CORESET; and the channel quality indicator is based on a measurement performed on the CSI-RS or the SSB signal.

Aspect 81: A user equipment (UE), comprising: a memory; a processor coupled to the memory; and a transceiver coupled to the processor, the UE configured to perform the methods of aspects 1-40, or 18a.

Aspect 82: A base station (BS), comprising: a memory; a processor coupled to the memory; and a transceiver coupled to the processor, the BS configured to perform the methods of aspects 41-80.

Aspect 83: A user equipment (UE) comprising means for performing the methods of aspects 1-40, or 18a.

Aspect 84: A base station (BS) comprising means for performing the methods of aspects 41-80.

Aspect 85: A non-transitory computer-readable medium (CRM) having program code recorded thereon, the program code comprises code for causing a UE to perform the methods of aspects 1-40, or 18a.

Aspect 86: A non-transitory computer-readable medium (CRM) having program code recorded thereon, the program code comprises code for causing a BS to perform the methods of aspects 41-80.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication performed by a user equipment (UE), the method comprising:
   detecting that (i) one or more first physical downlink control channel (PDCCH) transmissions are missing at the UE, and/or (ii) one or more second PDCCH transmissions are successfully decoded at the UE, wherein the one or more first PDCCH transmissions and/or the one or more second PDCCH transmissions are carried by a plurality of control resource sets (CORESETs) of the PDCCH,
   the one or more first and/or second PDCCH transmissions transmitted to the UE by a base station (BS) of a wireless communications network to which the UE is connected; and
   communicating, to the BS, an indicator of PDCCH decoding performance based on a number of the first one or more PDCCH transmissions and/or a number of the second one or more PDCCH transmissions, wherein the indicator of PDCCH decoding performance includes at least one of a CORESET-specific decoding performance or a CORESET-aggregate decoding performance.

2. The method of claim 1, wherein:
   the indicator of PDCCH decoding performance includes, for each CORESET, a CORESET-specific PDCCH decoding performance based on the one or more first PDCCH transmissions and/or the one or more second PDCCH transmissions carried by the CORESET.

3. The method of claim 1, wherein each CORESET is configured with a plurality of transmission configuration indication (TCI) states, the method further comprising:
   communicating, to the BS, an indication of a preferred TCI state of the plurality of TCI states to use for the one or more first PDCCH transmissions and/or the one or more second PDCCH transmissions.

4. The method of claim 1, wherein:
   the indicator of PDCCH decoding performance includes the CORESET-aggregate decoding performance, wherein the CORESET-aggregate decoding performance corresponds to the plurality of CORESETs based on the one or more first PDCCH transmissions and/or the one or more second PDCCH transmissions carried by the plurality of CORESETs.

5. The method of claim 1, further comprising:
   receiving, from the BS, a downlink (DL) or uplink (UL) grant including a downlink assignment index (DAI), wherein the detecting is based on the DAI.

6. The method of claim 1, wherein the indicator of PDCCH decoding performance includes one or more of:
   (i) the number of the one or more first PDCCH transmissions and/or a range including the number of the one or more first PDCCH transmissions;
   (ii) (a) a ratio of the number of the one or more first PDCCH transmissions and a total number of PDCCH transmissions transmitted by the BS to the UE and/or (b) a range including the ratio;
   (iii) the number of the one or more second PDCCH transmissions and/or a range including the number of the one or more second PDCCH transmissions; or
   (iv) (a) a ratio of the number of the one or more second PDCCH transmissions and a total number of PDCCH transmissions transmitted by the BS to the UE and/or (b) a range including the ratio.

7. The method of claim 1, wherein the number of the one or more first PDCCH transmissions and/or the number of the one or more second PDCCH transmissions are determined for a duration configured by a radio resource control (RRC) message transmitted by the BS to the UE.

8. The method of claim 1, wherein the communicating the indicator of PDCCH decoding performance occurs with a periodicity configured by a RRC message transmitted by the BS to the UE, and/or via an uplink resource configured by the RRC message.

9. The method of claim 8, wherein:
   the uplink resource is a physical uplink control channel (PUCCH) resource and the indicator of PDCCH decoding performance is carried on an uplink control information (UCI) transmitted from the UE to the BS via the PUCCH resource;
   the uplink resource is a physical uplink shared channel (PUSCH) resource and the indicator of PDCCH decoding performance is carried on a medium access control (MAC)-control element (CE) transmitted from the UE to the BS via the PUSCH resource; or
   the uplink resource is a physical uplink shared channel (PUSCH) resource and the indicator of PDCCH decoding performance is piggybacked on data transmitted from the UE to the BS via the PUSCH resource.

10. The method of claim 1, further comprising:
    receiving from the BS a downlink control information (DCI) configured to trigger the communicating the indicator of PDCCH decoding performance from the UE to the BS.

11. The method of claim 10, wherein:
    the DCI is an uplink (UL) scheduling DCI scheduling an uplink transmission via a PUSCH resource, and the indicator of PDCCH decoding performance is piggybacked on the uplink transmission; or
    the DCI is a downlink (DL) scheduling DCI indicating a PUCCH resource via which the communicating the indicator of PDCCH decoding performance occurs.

12. The method of claim 10, wherein the DCI is a group-common DCI transmitted by the BS to a plurality of UEs including the UE, the method further comprising:
    periodically monitoring the PDCCH for the group-common DCI, wherein the number of the one or more first PDCCH transmissions and/or the number of the one or more second PDCCH transmissions are determined for a duration equaling a periodicity of the periodical monitoring of the PDCCH.

13. A user equipment (UE), comprising:
    a processor configured to:
    detect that (i) one or more first physical downlink control channel (PDCCH) transmissions are missing at the UE, and/or (ii) one or more second PDCCH transmissions are successfully decoded at the UE, wherein the one or more first PDCCH transmissions and/or the one or more second PDCCH transmissions are carried by a plurality of control resource sets (CORESETs) of the PDCCH,
    the one or more first and/or second PDCCH transmissions transmitted to the UE by a base station (BS) of a wireless communications network to which the UE is connected; and
    a transceiver coupled with the processor, the transceiver configured to:

communicate, to the BS, an indicator of PDCCH decoding performance based on a number of the first one or more PDCCH transmissions and/or a number of the second one or more PDCCH transmissions, wherein the indicator of PDCCH decoding performance includes at least one of a CORESET-specific decoding performance or a CORESET-aggregate decoding performance.

14. The UE of claim 13, wherein:
the indicator of PDCCH decoding performance includes, for each CORESET, a CORESET-specific PDCCH decoding performance based on the one or more first PDCCH transmissions and/or the one or more second PDCCH transmissions carried by the CORESET.

15. The UE of claim 13, wherein:
the indicator of PDCCH decoding performance includes the CORESET-aggregate decoding performance, wherein the CORESET-aggregate decoding performance corresponds to the plurality of CORESETs based on the one or more first PDCCH transmissions and/or the one or more second PDCCH transmissions carried by the plurality of CORESETs.

16. The UE of claim 13, wherein the transceiver is further configured to:
receive from the BS a downlink control information (DCI) configured to trigger the UE to communicate the indicator of PDCCH decoding performance from the UE to the BS.

17. The UE of claim 16, wherein:
the DCI is an uplink (UL) scheduling DCI scheduling an uplink transmission via a PUSCH resource, and the indicator of PDCCH decoding performance is piggybacked on the uplink transmission; or
the DCI is a downlink (DL) scheduling DCI indicating a PUCCH resource via which the communicating the indicator of PDCCH decoding performance occurs.

18. The UE of claim 16, wherein the DCI is a group-common DCI transmitted by the BS to a plurality of UEs including the UE, wherein the UE is further configured to:
periodically monitor the PDCCH for the group-common DCI, wherein the number of the one or more first PDCCH transmissions and/or the number of the one or more second PDCCH transmissions are determined for a duration equaling a periodicity of the periodical monitoring of the PDCCH.

19. A method of wireless communication performed by a user equipment (UE), the method comprising:
receiving, from a base station (BS) of a wireless communication network to which the UE is connected, a control message indicating uplink resources for the UE to provide an indicator of physical downlink control channel (PDCCH) decoding performance for a plurality of control resource sets (CORESETs), wherein the indicator of PDCCH decoding performance includes at least one of a CORESET-specific decoding performance or a CORESET-aggregate decoding performance;
receiving, from the BS, a reference signal;
determining a channel quality indicator of a PDCCH transmission from the BS to the UE based on the received reference signal; and
communicating, to the BS in the uplink resources, the channel quality indicator.

20. The method of claim 19, wherein the reference signal is a demodulation reference signal (DMRS), a channel state information (CSI)-reference signal (RS), or a synchronization signal block (SSB) signal.

21. The method of claim 20, wherein the channel quality indicator is a reference signal received power (RSRP) of control channel elements of a PDCCH carrying the DMRS.

22. The method of claim 19, wherein the channel quality indicator is a hypothetical block error rate (BLER) of the PDCCH transmission determined based on the received reference signal, or an aggregation level (AL) of the PDCCH transmission indicating a number of successive control channel elements carrying the PDCCH transmission when a BLER of the PDCCH transmission is no greater than a threshold BLER.

23. The method of claim 22, wherein the BLER of the PDCCH transmission and/or the AL of the PDCCH transmission are computed based on a physical layer parameter of a PDCCH carrying the PDCCH transmission including a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of a DCI configured to trigger the communicating the channel quality indicator.

24. The method of claim 19, further comprising: receiving, from the BS, a DCI configured to trigger the communicating the channel quality indicator from the UE to the BS.

25. The method of claim 24, wherein: the determining includes determining (a) an aggregation level (AL) of the PDCCH transmission and/or (b) a block error rate (BLER) of the PDCCH transmission based on a physical layer parameter of a PDCCH carrying the PDCCH transmission.

26. The method of claim 25, wherein the physical layer parameter of the PDCCH includes a precoder granularity of a CORESET of the PDCCH, a control channel element (CCE)-to-resource element group (REG) mapping type of the CORESET, a REG bundle size of a REG bundle of the CORESET indicating a number of REGs in the REG bundle, and/or a size of the DCI.

27. A user equipment (UE), comprising:
a transceiver configured to:
receive, from a base station (BS) of a wireless communication network to which the UE is connected, control message indicating uplink resources for the UE to provide an indicator of physical downlink control channel (PDCCH) decoding performance for a plurality of control resource sets (CORESETS), wherein the indicator of PDCCH decoding performance includes at least one of a CORESET-specific decoding performance or a CORESET-aggregate decoding performance; and
receive, from the BS, a reference signal; and
a processor coupled with the transceiver, the processor configured to:
determine a channel quality indicator of a PDCCH transmission from the BS to the UE based on the received reference signal, wherein the transceiver is further configured to:
communicate, to the BS in the uplink resources, the channel quality indicator.

28. The UE of claim 27, wherein the UE is configured to communicate the channel quality indicator based on a periodicity and/or via an uplink resource configured by a radio resource control (RRC) message transmitted by the BS to the UE, the PDCCH transmission being a most recent PDCCH transmission from the BS to the UE prior to the communicating the channel quality indicator.

29. The UE of claim 27, wherein the PDCCH transmission is configured to schedule an uplink transmission via a PUSCH resource, and the channel quality indicator is piggybacked in the uplink transmission.

30. The UE of claim 27, wherein the PDCCH transmission includes a resource indicator indicating a PUCCH resource via which the communicating the channel quality indicator occurs.

\* \* \* \* \*